(12) United States Patent
Hoshi et al.

(10) Patent No.: US 10,859,010 B2
(45) Date of Patent: Dec. 8, 2020

(54) ESTIMATION DEVICE AND CONTROL DEVICE FOR COMBUSTION SYSTEM

(71) Applicant: DENSO CORPORATION, Kariya (JP)

(72) Inventors: Shinya Hoshi, Kariya (JP); Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 145 days.

(21) Appl. No.: 15/773,583

(22) PCT Filed: Sep. 13, 2016

(86) PCT No.: PCT/JP2016/076877
§ 371 (c)(1),
(2) Date: May 4, 2018

(87) PCT Pub. No.: WO2017/081929
PCT Pub. Date: May 18, 2017

(65) Prior Publication Data
US 2018/0320606 A1 Nov. 8, 2018

(30) Foreign Application Priority Data

Nov. 12, 2015 (JP) ................................. 2015-222311

(51) Int. Cl.
*F02D 19/06* (2006.01)
*F02D 41/14* (2006.01)
(Continued)

(52) U.S. Cl.
CPC ..... *F02D 19/0636* (2013.01); *F02D 41/1458* (2013.01); *F02D 41/3863* (2013.01);
(Continued)

(58) Field of Classification Search
CPC ............ F02D 19/0636; F02D 41/1458; F02D 41/3863; F02D 41/401; F02D 2200/0612;
(Continued)

(56) References Cited

U.S. PATENT DOCUMENTS

2004/0069273 A1* 4/2004 Visser ............... F02P 5/1502
123/406.47
2004/0261414 A1 12/2004 Araki
(Continued)

FOREIGN PATENT DOCUMENTS

JP 6-081751 3/1994
JP 11-125134 5/1999
(Continued)

OTHER PUBLICATIONS

U.S. Appl. No. 15/773,578 of Hoshi, et al., filed May 4, 2018, entitled Estimation Device and Control Device for Combustion System (72 pages).
(Continued)

*Primary Examiner* — Joseph J Dallo
*Assistant Examiner* — Scott A Reinbold
(74) *Attorney, Agent, or Firm* — Nixon & Vanderhye, P.C.

(57) ABSTRACT

A fuel passage leads a fuel from a pressure-accumulation vessel to a nozzle hole of a fuel injection valve. A fuel pressure sensor detects a fuel pressure in a fuel passage. An estimation device is applicable to a combustion system, which includes these components, and includes a mixing acquisition unit and an injection amount estimation unit. The mixing acquisition unit acquires the mixing ratio of various components contained in the fuel used for combustion in the internal combustion engine. The injection amount estimation unit estimates an injection amount of the fuel from the nozzle hole according to a change mode of the fuel pressure, which is detected with the fuel pressure sensor and associated with injection of the fuel from a nozzle hole, and the mixing ratio acquired with the mixing acquisition unit.

9 Claims, 9 Drawing Sheets

(51) Int. Cl.
*F02D 41/38* (2006.01)
*F02D 41/40* (2006.01)
*F02D 41/00* (2006.01)
*F02M 47/02* (2006.01)
*F02M 57/00* (2006.01)
*F02M 26/25* (2016.01)

(52) U.S. Cl.
CPC ........ *F02D 41/401* (2013.01); *F02D 41/0007* (2013.01); *F02D 41/0057* (2013.01); *F02D 41/144* (2013.01); *F02D 2041/1433* (2013.01); *F02D 2041/389* (2013.01); *F02D 2200/0602* (2013.01); *F02D 2200/0612* (2013.01); *F02D 2200/0616* (2013.01); *F02D 2200/0802* (2013.01); *F02M 26/25* (2016.02); *F02M 47/027* (2013.01); *F02M 57/005* (2013.01)

(58) Field of Classification Search
CPC ......... F02D 2200/0802; F02D 41/0007; F02D 2041/389; F02D 2041/1433; F02D 41/0057; F02D 41/144; F02D 2200/0602; F02D 2200/0616; F02M 47/027; F02M 57/005; F02M 26/25
USPC ....................................................... 701/103
See application file for complete search history.

(56) References Cited

U.S. PATENT DOCUMENTS

| | | |
|---|---|---|
| 2008/0228374 A1 | 9/2008 | Ishizuka et al. |
| 2013/0220006 A1* | 8/2013 | Ito ...................... F02D 41/0025 73/114.51 |
| 2015/0346180 A1 | 12/2015 | Yamada et al. |

FOREIGN PATENT DOCUMENTS

| | | |
|---|---|---|
| JP | 2002-227693 | 8/2002 |
| JP | 2005-48703 | 2/2005 |
| JP | 2009-097385 | 5/2009 |
| JP | 2010-169549 | 8/2010 |
| JP | 2011-236788 | 11/2011 |
| JP | 2013-24138 | 2/2013 |

OTHER PUBLICATIONS

U.S. Appl. No. 15/773,584 of Hoshi, et al., filed May 4, 2018, entitled Estimation Device and Control Device for Combustion System (66 pages).

U.S. Appl. No. 15/773,590 of Hoshi, et al., filed May 4, 2018, entitled Estimation Device and Control Device for Combustion System (70 pages).

U.S. Appl. No. 15/773,604 of Okabayashi, et al., filed May 4, 2018, entitled Combustion System Estimation Device and Control Device, (70 pages).

U.S. Appl. No. 15/773,625 of Hoshi, et al., filed May 4, 2018, Estimation Device and Control Device for Combustion System, (60 pages).

* cited by examiner

FIG. 3

$$\begin{Bmatrix} \text{MIXING AMOUNT OF LINEAR PARAFFINS} \\ \text{MIXING AMOUNT OF NAPHTHENES} \\ \text{MIXING AMOUNT OF SIDE CHAIN PARAFFINS} \\ \text{MIXING AMOUNT OF AROMATICS} \\ \vdots \end{Bmatrix} = \begin{bmatrix} a_{00} & \cdots & a_{0Y} \\ \vdots & \ddots & \vdots \\ a_{X0} & \cdots & a_{XY} \end{bmatrix} \cdot \begin{Bmatrix} \text{IGNITION DELAY TIME } TD(i) : P(i), T(i), O_2(i), P_C(i) \\ \text{IGNITION DELAY TIME } TD(j) : P(j), T(j), O_2(j), P_C(j) \\ \text{IGNITION DELAY TIME } TD(k) : P(k), T(k), O_2(k), P_C(k) \\ \text{IGNITION DELAY TIME } TD(l) : P(l), T(l), O_2(l), P_C(l) \\ \vdots \end{Bmatrix}$$

MOLECULAR STRUCTURAL SPECIES     CONSTANTS     FLAMMABILITY PARAMETERS

FIG. 4
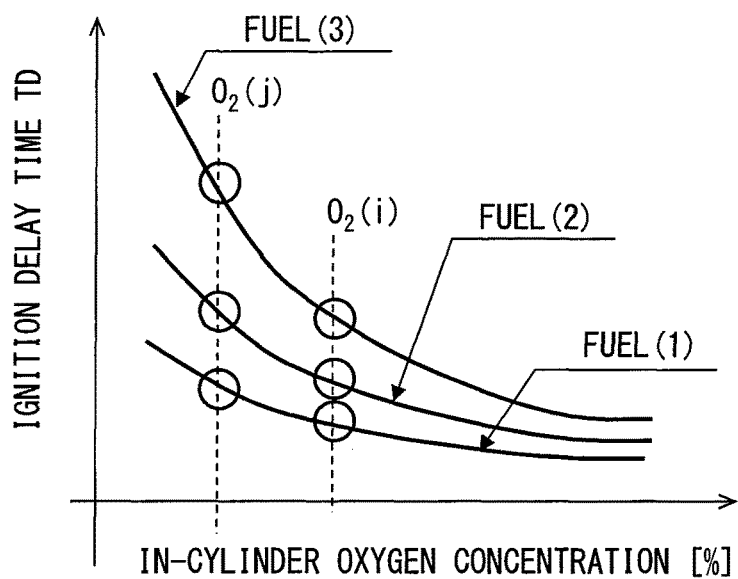
FIG. 5
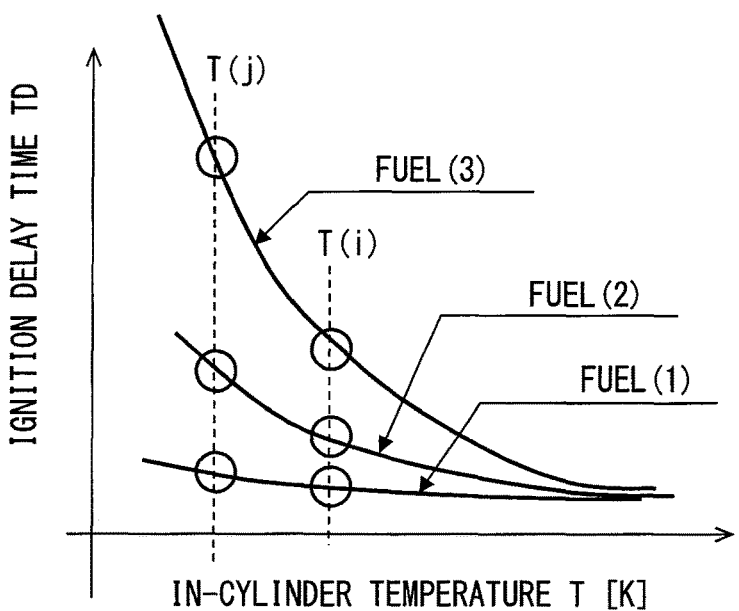
FIG. 6
| | MOLECULAR STRUCTURE TYPE A | MOLECULAR STRUCTURE TYPE B | MOLECULAR STRUCTURE TYPE C |
|---|---|---|---|
| FUEL (1) | LARGE | LARGE | SMALL |
| FUEL (2) | SMALL | LARGE | SMALL |
| FUEL (3) | LARGE | SMALL | LARGE |

FIG. 11

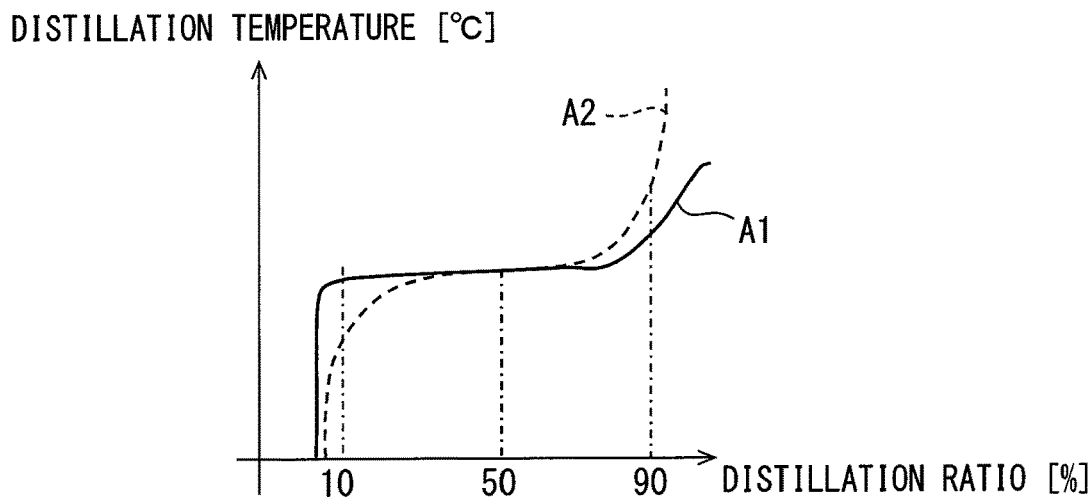

FIG. 12

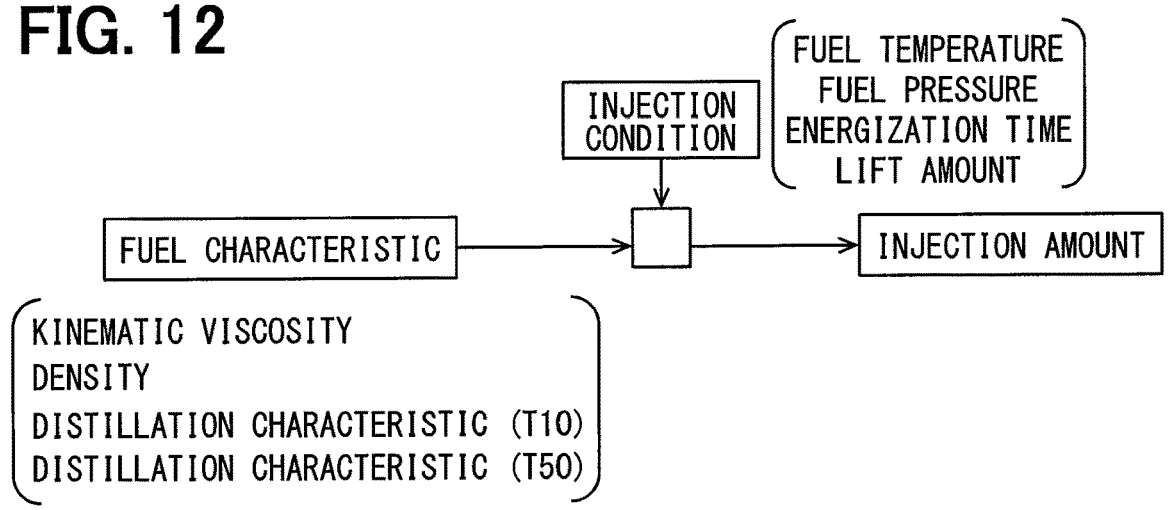

FIG. 13

$$\begin{pmatrix} \text{INJECTION DEVIATION AMOUNT } \Delta Q_1 \\ \text{INJECTION DEVIATION AMOUNT } \Delta Q_2 \\ \text{INJECTION DEVIATION AMOUNT } \Delta Q_3 \\ \cdots \end{pmatrix} = \begin{pmatrix} b_{00} & \cdots & b_{0Y} \\ \vdots & \ddots & \vdots \\ b_{X0} & \cdots & b_{XY} \end{pmatrix} \cdot \begin{pmatrix} \text{KINEMATIC VISCOSITY} \\ \text{DENSITY} \\ \text{DISTILLATION CHARACTERISTIC : T10} \\ \text{DISTILLATION CHARACTERISTIC : T50} \\ \cdots \end{pmatrix}$$

ESTIMATION DEVICE AND CONTROL DEVICE FOR COMBUSTION SYSTEM

CROSS REFERENCE TO RELATED APPLICATION

This application is the U.S. national phase of International Application No. PCT/JP2016/076877 filed Sep. 13, 2016, which designated the U.S. and claims priority to Japanese Patent Application No. 2015-222311 filed on Nov. 12, 2015, the entire contents of each of which are incorporated herein by reference.

TECHNICAL FIELD

The present disclosure relates to an estimation device, which is to estimate an injection amount of a fuel from a fuel injection valve into a combustion system, and a control device to control the combustion system.

BACKGROUND ART

Conventionally, a combustion system, which is known, includes a pressure-accumulation vessel such as a common rail, a fuel injection valve to inject a fuel, which is accumulated in the pressure-accumulation vessel, from an injection hole, and a fuel passage, which leads the fuel from the pressure-accumulation vessel to the injection hole. For example, in Patent Literature 1, a combustion system includes a fuel pressure sensor to detect a fuel pressure in a fuel passage. In the present configuration, when the fuel pressure of the fuel passage changes in a case where the fuel is injected from the injection hole, the fuel pressure sensor detects a change mode of the fuel pressure, and the injection amount of fuel is estimated according to a detection result.

PRIOR ART LITERATURE

Patent Literature

Patent Literature 1: JP2005-48703A

However, a fuel having various properties exists as a fuel supplied from the pressure-accumulation vessel to the fuel injection valve. When the combustion system estimates the injection amount of fuel based on the change mode of fuel pressure, it is concerned that an estimation precision decreases.

SUMMARY OF INVENTION

It is an object of the present disclosure to produce an estimation device and a control device to enable to improve an estimation precision of an injection amount of a fuel from a fuel injection valve in a combustion system.

The inventors obtain that the injection amount (injection mass) of the fuel injected from the injection hole differs when a change mode of the fuel pressure in response to the injection of the fuel injected from the injection hole is constant in case where components contained in the fuel differ or in a case where mixing ratios of the components differ. Thus, it is concerned that the estimation precision decreases when the injection amount of the fuel is estimated based on the change mode of the fuel pressure.

In the first mode of the present disclosure, the combustion system to which the estimation device is applied includes a pressure-accumulation vessel, which is to accumulate a fuel used for combustion in an internal combustion engine, a fuel injection valve, which is to inject the fuel from a nozzle hole, a fuel passage, which is to lead the fuel from the pressure-accumulation vessel to the nozzle hole, and a fuel pressure sensor, which is to detect a fuel pressure in the fuel passage. The estimation device includes a mixing acquisition unit to acquire a mixing ratio of various components contained in the fuel used for combustion in the internal combustion engine. The estimation device further includes an injection amount estimation unit to estimate an injection amount of the fuel from the nozzle hole according to a change mode of the fuel pressure, which is detected with the fuel pressure sensor and associated with injection of the fuel from the nozzle hole, and the mixing ratio acquired with the mixing acquisition unit.

In the second mode of the present disclosure, the combustion system to which the estimation device is applied includes a pressure-accumulation vessel, which is to accumulate a fuel used for combustion in an internal combustion engine, a fuel injection valve, which is to inject the fuel from a nozzle hole, a fuel passage, which is to lead the fuel from the pressure-accumulation vessel to the nozzle hole, and a fuel pressure sensor, which is to detect a fuel pressure in the fuel passage. The estimation device includes a mixing acquisition unit to acquire a mixing ratio of various components contained in the fuel used for combustion in the internal combustion engine. The estimation device further includes an injection amount estimation unit to estimate the injection amount of the fuel from the nozzle hole according to a change mode of the fuel pressure, which is detected with the fuel pressure sensor and associated with injection of the fuel from the nozzle hole, and the mixing ratio acquired with the mixing acquisition unit. The estimation device further includes a combustion control unit to control the combustion system according to an estimation result of the injection amount estimation unit.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram illustrating a relationship among multiple ignition delay times, parameters representing flammability, and mixing amounts of various components;

FIG. 4 is a diagram showing a relationship between a characteristic line representing a change in the ignition delay time caused due to an in-cylinder oxygen concentration and a molecular structural species of a fuel;

FIG. 5 is a diagram showing a relationship between the characteristic line representing a change in the ignition delay time caused due to an in-cylinder temperature and a molecular structural species of the fuel;

FIG. 6 is a view showing a relationship between a characteristic line specified based on an ignition delay time and a mixing ratio of a molecular structural species;

FIG. 11 is a diagram illustrating distillation characteristics;

FIG. 12 is a diagram illustrating an estimation of the injection amount;

FIG. 13 is a diagram showing a model for estimating the injection amount;

DESCRIPTION OF EMBODIMENTS

Figure 1:
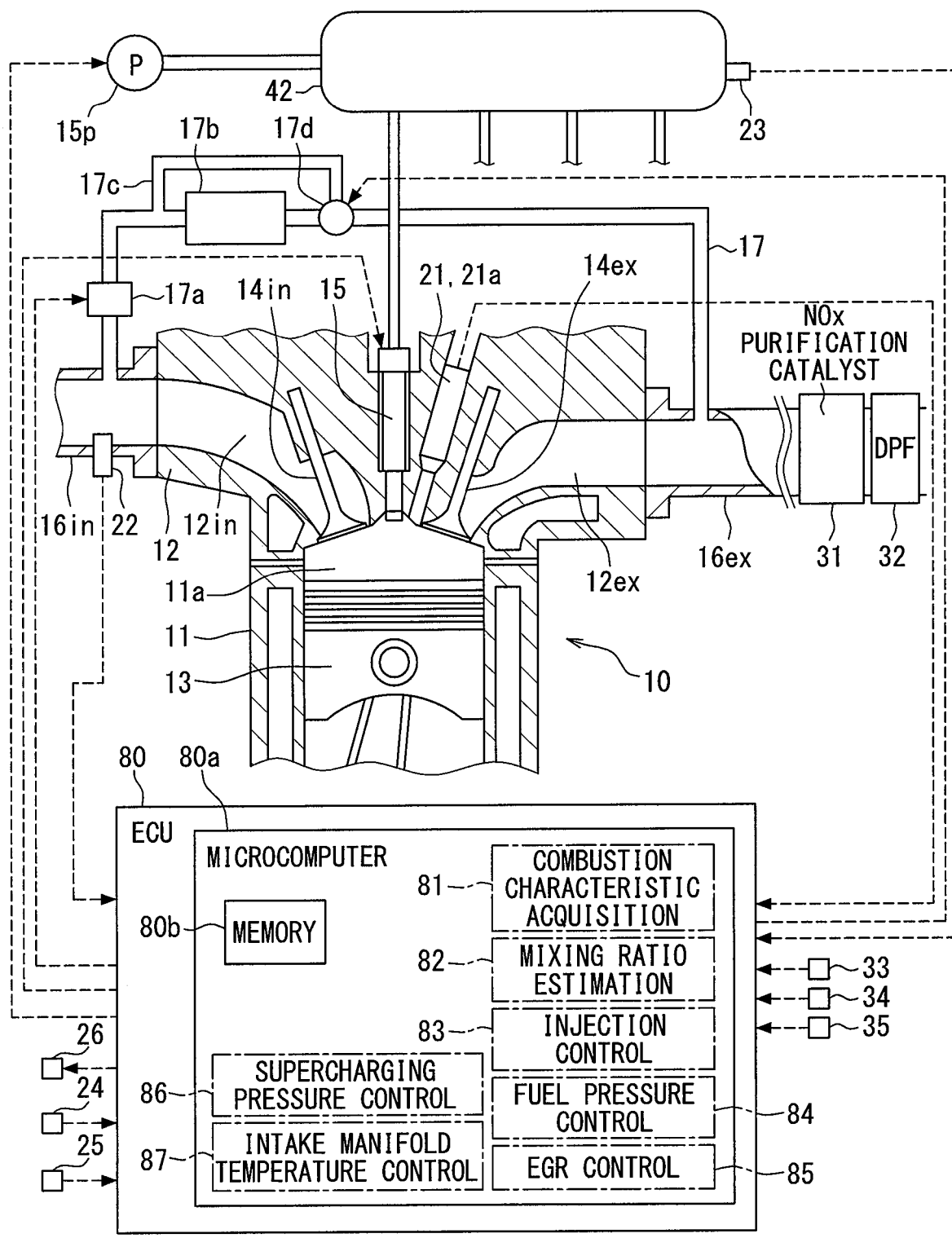
FIG. 1 is a schematic diagram of a combustion system according to a first embodiment.

Hereinafter, multiple embodiments for carrying out the present disclosure will be described with reference to accompanying drawings. In the following description of the embodiments, the same reference numerals will be used to refer to the same and already described elements and description thereof will be omitted in some cases. When only a part of a configuration in each embodiment is changed, the other parts of the configuration can be configured as the same as a prior embodiment.

First Embodiment

A combustion system according to the present embodiment includes an estimation device and a control device, which are implemented as an electronic control device (ECU 80) shown in FIG. 1. The ECU 80 includes a microcomputer (microcomputer 80a), an input processing circuit, an output processing circuit, and the like (none shown). The microcomputer 80a includes a central processing unit (CPU) not shown and a memory 80b. The CPU executes a predetermined program stored in the memory 80b, thereby to cause the microcomputer 80a to control the operation of a fuel injection valve 15, a fuel pump 15p, an EGR valve 17a, a temperature control valve 17d, and a supercharging pressure regulator 26 and the like included in the combustion system. Under those controls, a combustion state of an internal combustion engine 10 in the combustion system is controlled in a desired state. The combustion system and the ECU 80 are mounted in a vehicle, and the vehicle travels with the use of an output power of the internal combustion engine 10 as a driving source.

The internal combustion engine 10 includes a cylinder block 11, a cylinder head 12, a piston 13, and the like. An intake valve 14in, an exhaust valve 14ex, a fuel injection valve 15, and an in-cylinder pressure sensor 21 are equipped to the cylinder head 12.

The fuel pump 15p pumps a fuel in a fuel tank 40 (refer to FIG. 7) to a common rail 42. The ECU 80 controls the operation of the fuel pump 15p, as a result of which the fuel in the common rail 42 is stored in the common rail 42 in a state where the fuel is maintained at a target pressure Ptrg. The common rail 42 is a pressure-accumulation vessel accumulating the fuel and distributes the accumulated fuel to the fuel injection valves 15 of the respective cylinders. The fuel injected from the fuel injection valve 15 mixes with an intake air in a combustion chamber 11a to form an air-fuel mixture, and the air-fuel mixture is compressed by the piston 13 and self-ignited. In short, the internal combustion engine 10 is a compression self-ignition type diesel engine, and a light oil is used as the fuel. Incidentally, as a fuel injection by the fuel injection valve 15, there is spray spraying the fuel in the form of mist.

The fuel injection valve 15 is configured by accommodating an electromagnetic actuator and a valve body inside a body. When the ECU 80 causes the energization of the electromagnetic actuator, an electromagnetic attraction force of the electromagnetic actuator causes a leak passage of a back pressure chamber (not shown) to open. The valve body opens in association with a reduction in the back pressure, and an injection hole provided in the body is opened. Thus, the fuel is injected from the injection hole. When the energization is turned off, the valve body is closed and the fuel injection is stopped.

An intake pipe 16in and an exhaust pipe 16ex are connected to an intake port 12in and an exhaust port 12ex, which are provided in the cylinder head 12, respectively. An EGR pipe 17 is connected to the intake pipe 16in and the exhaust pipe 16ex. A part (EGR gas) of the exhaust gas flows (returns) to the intake pipe 16in through the EGR pipe 17. An EGR valve 17a is equipped to the EGR pipe 17. The ECU 80 controls the operation of the EGR valve 17a, thereby to control an opening degree of the EGR pipe 17, and to control a flow rate of the EGR gas.

Furthermore, an EGR cooler 17b for cooling the EGR gas, a bypass pipe 17c, and a temperature control valve 17d are equipped to an upstream portion of the EGR valve 17a of the EGR pipe 17. The bypass pipe 17c defines a bypass flow channel that causes the EGR gas to bypass the EGR cooler 17b. The temperature control valve 17d adjusts the opening degree of the bypass flow channel, thereby to adjust a ratio between the EGR gas flowing through the EGR cooler 17b and the EGR gas flowing through the bypass flow channel, and finally to adjust a temperature of the EGR gas flowing into the intake pipe 16in. In this example, the intake air flowing into the intake port 12in contains an external air (fresh air) flowing from the intake pipe 16in and the EGR gas. Therefore, the adjustment of the temperature of the EGR gas with the temperature control valve 17d represents the adjustment of the temperature (intake manifold temperature) of the intake air flowing into the intake port 12in.

The combustion system is provided with a supercharger not shown. The supercharger has a turbine that is attached to the exhaust pipe 16ex and a compressor that is attached to the intake pipe 16in. When the turbine rotates due to a flow energy of the exhaust gas, the compressor rotates by the rotational force of the turbine, and the fresh air is compressed (supercharged) by the compressor. The supercharging pressure regulator 26 described above is a device for changing a capacity of the turbine. The ECU 80 controls the operation of the supercharging pressure regulator 26 to adjust the turbine capacity, thereby to control a supercharging pressure caused by the compressor.

In addition, the combustion system includes a NOx purification catalyst 31 and a DPF 32. The NOx purification catalyst 31 includes an adsorption catalyst that adsorbs nitrogen oxide NOx in the exhaust gas, a reduction catalyst that reduces NOx to nitrogen $N_2$, and the like. The DPF 32 (Diesel Particulate Filter) is a fine particle collecting device that is located in the further downstream side of the NOx purification catalyst 31, and collects fine particles contained in the exhaust gas. The exhaust gas flowing through the exhaust pipe 16ex passes through both of the NOx purification catalyst 31 and the DPF 32 and is subsequently discharged from a downstream end of the exhaust pipe 16ex. In the combustion system, the NOx purification catalyst 31 and the DPF 32 configure an exhaust gas purification device.

The ECU 80 receives detection signals from various sensors such as the in-cylinder pressure sensor 21, an oxygen concentration sensor 22, a rail pressure sensor 23, a crank angle sensor 24, an accelerator pedal sensor 25, an exhaust gas temperature sensor 33, an exhaust gas pressure sensor 34, and a catalyst temperature sensor 35.

The in-cylinder pressure sensor 21 outputs a detection signal corresponding to a pressure (in-cylinder pressure) of the combustion chamber 11a. The in-cylinder pressure sensor 21 has a temperature detection element 21a in addition to the pressure detection element, and outputs a detection signal corresponding to a temperature (in-cylinder temperature) of the combustion chamber 11a. The oxygen concentration sensor 22 is equipped to the intake pipe 16in and outputs a detection signal corresponding to an oxygen concentration in the intake air. The intake air to be detected is a mixture of fresh air and EGR gas. The rail pressure sensor 23 is equipped to the common rail 42 and outputs a detection signal corresponding to the pressure (rail pressure) of the accumulated fuel. The crank angle sensor 24 outputs a detection signal corresponding to the rotational speed (engine speed) of the crankshaft that is rotationally driven by the piston 13. The accelerator pedal sensor 25 outputs a detection signal corresponding to the depression amount (engine load) of an accelerator pedal depressed by a vehicle driver.

The exhaust gas temperature sensor 33 is equipped to the exhaust pipe 16ex, and detects an exhaust gas temperature. The exhaust gas pressure sensor 34 is equipped to the exhaust pipe 16ex, and detects an exhaust gas pressure. The exhaust gas temperature sensor 33 and the exhaust gas pressure sensor 34 are located between the NOx purification catalyst 31 and the turbine in the exhaust pipe 16ex.

The catalyst temperature sensor 35 is located between the NOx purification catalyst 31 and the DPF 32 in the exhaust pipe 16ex and detects an internal temperature of the NOx purification catalyst 31, thereby to detect the temperature of the exhaust gas that has passed through the NOx purification catalyst 31. The catalyst temperature sensor 35 may be equipped to the NOx purification catalyst 31.

The ECU 80 controls operations of the fuel injection valve 15, the fuel pump 15p, the EGR valve 17a, the temperature control valve 17d, and the supercharging pressure regulator 26, based on the respective detection signals of the sensors 21 to 25 and 33 to 35. In this way, a fuel injection start timing, the injection amount, an injection pressure, an EGR gas flow rate, an intake manifold temperature and a supercharging pressure are controlled.

While controlling the operation of the fuel injection valve 15, the microcomputer 80a functions as an injection control unit 83 to control the fuel injection start timing, the injection amount, and the number of injection stages related to the multistage injection. There is a case where the injection control is performed so that the same fuel injection valve 15 injects the fuel for multiple times (multistage injection) during one combustion cycle. The multiple injection include a main injection with the largest injection amount, a pilot injection performed at a timing before the main injection, and a post injection performed at a timing after the main injection.

While controlling the operation of the fuel pump 15p, the microcomputer 80a functions as a fuel pressure control unit 84 that controls the injection pressure. While controlling the operation of the EGR valve 17a, the microcomputer 80a functions as an EGR control unit 85 that controls the EGR gas flow rate. While controlling the operation of the temperature control valve 17d, the microcomputer 80a functions as an intake manifold temperature control unit 87 that controls the intake manifold temperature. While controlling the operation of the supercharging pressure regulator 26, the microcomputer 80a functions as a supercharging pressure control unit 86 that controls the supercharging pressure.

Figure 2:
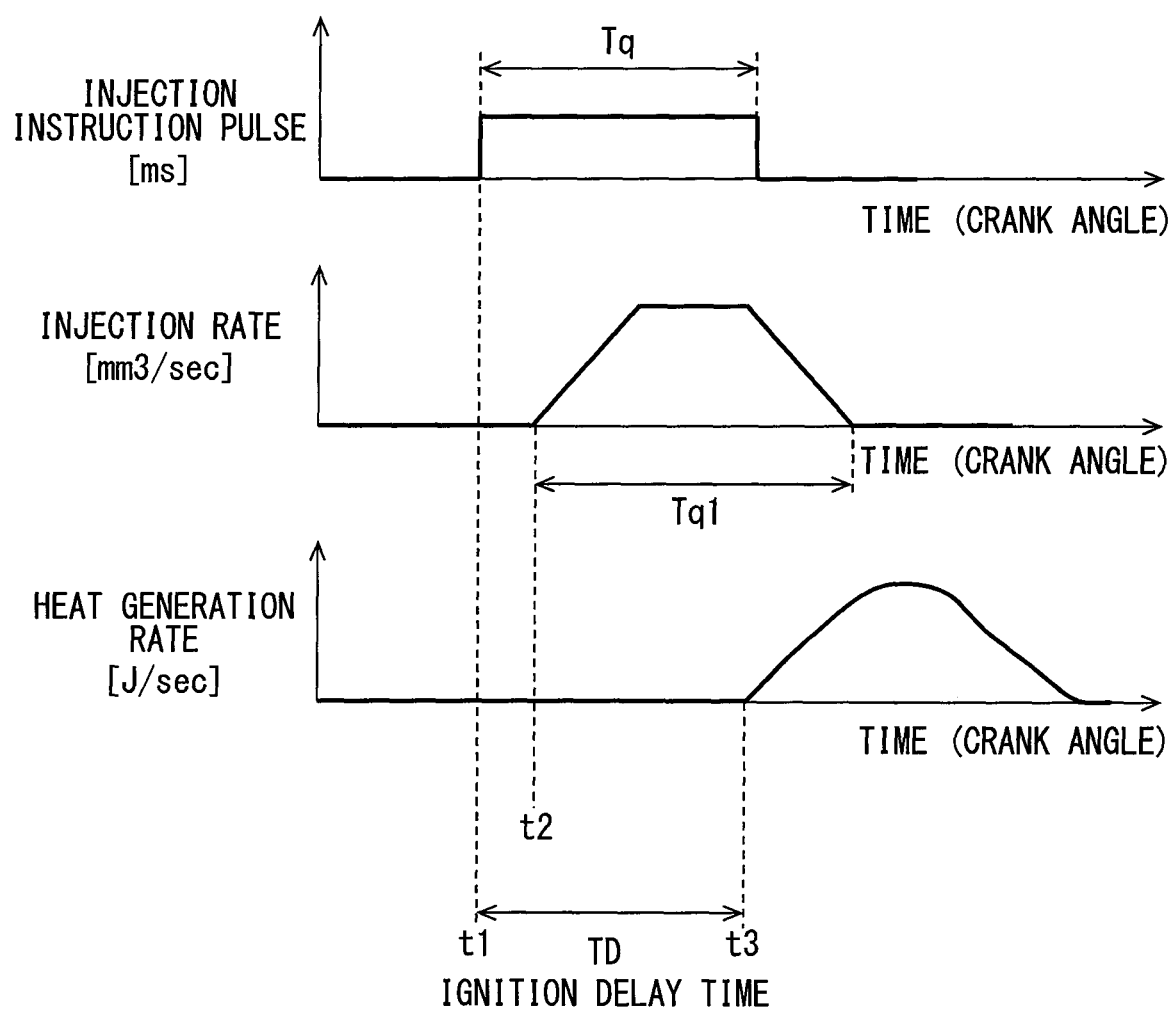
FIG. 2 is an illustrative diagram of an ignition delay time.

The microcomputer 80a also functions as a combustion characteristic acquisition unit 81 that acquires a detection value (combustion characteristic value) of a physical quantity relating to combustion. The combustion characteristic value according to the present embodiment represents an ignition delay time TD shown in FIG. 2. An upper part of FIG. 2 shows a pulse signal output from the microcomputer 80a. Energization of the fuel injection valve 15 is controlled according to the pulse signal. Specifically, the energization is started at a time point t1 when the pulse is on, and the energization continues in a pulse on period Tq. In short, the injection start timing is controlled according to the pulse on timing. In addition, the injection period is controlled according to the pulse on period Tq, and further, the injection amount is controlled.

A middle part of FIG. 2 shows a change in an injection state of the fuel from the injection hole, which results from the valve opening operation and the valve closing operation of the valve body according to the pulse signal. Specifically, the middle part of FIG. 2 shows a change in the injection amount (injection rate) of the fuel injected per unit time. As shown in the drawing, there is a time lag from the time point t1, when energization is started, to a time period t2 when the injection is actually started. There is also a time lag from an energization completion time point until the injection is actually stopped. A period Tq1 in which the injection is actually performed is controlled according to a pulse on period Tq.

A lower part of FIG. 2 shows a change in the combustion state of the injected fuel in the combustion chamber 11a. Specifically, the lower part of FIG. 2 shows a change in heat quantity (heat generation rate) per unit time caused by self-ignition combustion of a mixture of the injected fuel with the intake air. As shown in the drawing, there is a time lag from the time point t2 of the injection start to a time point t3 when the combustion actually starts. In the present embodiment, a time from the time point t1, at which the energization starts, to the time point t3, at which the combustion starts, is defined as an ignition delay time TD.

The combustion characteristic acquisition unit 81 estimates the time point t3, when the combustion starts, based on the change in the in-cylinder pressure detected with the in-cylinder pressure sensor 21. Specifically, during a period, in which a crank angle rotates by a predetermined amount, after the piston 13 has reached a top dead center, a timing at which the in-cylinder pressure suddenly rises is estimated as a combustion start timing (time point t3). The ignition delay time TD is calculated by the combustion characteristic acquisition unit 81 based on the estimation result. Further, the combustion characteristic acquisition unit 81 acquires various states (combustion conditions) at the time of combustion for each combustion. Specifically, the in-cylinder pressure, the in-cylinder temperature, the intake oxygen concentration, and the injection pressure are acquired as combustion conditions.

Those combustion conditions are parameters expressing a flammability of the fuel. The air-fuel mixture is more likely to self-ignite and likely to burn as the in-cylinder pressure immediately before the combustion is higher, as the in-cylinder temperature immediately before the combustion is higher, as the intake oxygen concentration is higher, and as the injection pressure is higher. As the in-cylinder pressure and the in-cylinder temperature just before the combustion, for example, a value detected at the time point t1 at which the energization of the fuel injection valve 15 is started may be used. The in-cylinder pressure is detected with the in-cylinder pressure sensor 21. The in-cylinder temperature is detected with the temperature detection element 21*a*. The intake oxygen concentration is detected with the oxygen concentration sensor 22. The injection pressure is detected with the rail pressure sensor 23. The combustion characteristic acquisition unit 81 stores the acquired ignition delay time TD in the memory 80*b* in association to the parameters (combustion conditions) related to the combustion.

The microcomputer 80*a* also functions as a mixing ratio estimation unit 82 to estimate the mixing ratio of the molecular structural species contained in the fuel based on the multiple combustion characteristic values detected under the different combustion conditions. For example, the microcomputer 80*a* substitutes the ignition delay time TD for each different combustion condition into a determinant shown in FIG. 3 to calculate the mixing amount of the molecular structural species. The microcomputer 80*a* divides each of the calculated mixing amounts by the total amount, thereby to calculate the mixing ratio of the molecular structural species.

A matrix on the left side of FIG. 3 has x rows and one column and includes x numbers. Those numerical values represent the mixing amounts of various components. The various components are classified according to the type of molecular structure. Types of molecular structure include linear paraffins, side chain paraffins, naphthenes and aromatics.

The matrix on the left side of the right side is x rows and y columns, and has numerical values such as a00 . . . aXY. Those numerical values are constants determined on the basis of tests conducted in advance. The matrix on the right side of the right hand is y row 1 column and has y numbers. Those numerical values are the ignition delay time TD acquired with the combustion characteristic acquisition unit 81. For example, a numerical value of a first row and a first column represents an ignition delay time TD(i) acquired under a combustion condition i set in a predetermined combination of the parameters, and a numerical value of a second row and the first column represents an ignition delay time TD(j) acquired under a combustion condition j. All of the parameters are set to different values between the combustion condition i and the combustion condition j. Symbols P(i), T(i), O2(i) and Pc(i) in FIG. 3 indicate the in-cylinder pressure, the in-cylinder temperature, the intake oxygen concentration, and the injection pressure under the combustion condition i, respectively. Symbols P(j), T(j), O2(j) and Pc(j) indicate the respective parameters under the combustion condition j.

Subsequently, a description will be made on a theory that the mixing amount of the molecular structural species can be calculated by substituting the ignition delay time TD for each combustion condition in the determinant of FIG. 3 with reference to FIGS. 4, 5, and 6.

As shown in FIG. 4, since the air-fuel mixture is more likely to self-ignite as the concentration of oxygen (in-cylinder oxygen concentration) contained in the air-fuel mixture related to the combustion is higher, the ignition delay time TD becomes shorter. Three solid lines (1), (2) and (3) in the drawing are characteristic lines showing the relationship between an in-cylinder oxygen concentration and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder oxygen concentration is O2(i), it can be estimated which molecular structural species is targeted. In particular, by comparing the ignition delay time TD in a case where the in-cylinder oxygen concentration is O2(i) with the ignition delay time TD in a case where the in-cylinder oxygen concentration is O2(j), the mixing ratio can be estimated with higher precision.

Similarly, as shown in FIG. 5, since the self-ignition tends to occur more easily as the in-cylinder temperature becomes higher, the ignition delay time TD becomes shorter. Three solid lines (1), (2) and (3) in the drawing are characteristic lines showing a relationship between the in-cylinder temperature and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder temperature is B1, it can be estimated which molecular structural species is targeted. In particular, by comparing the ignition delay time TD in a case where the in-cylinder temperature is T(i) with the ignition delay time TD in a case where the in-cylinder temperature is T(j), the mixing ratio can be estimated with higher precision.

Further, the molecular structural species highly influenced by the characteristic line relating to the in-cylinder oxygen concentration (refer to FIG. 4) is different from the molecular structural species highly influenced by the characteristic line relating to the in-cylinder temperature (refer to FIG. 5). As described above, the molecular structural species having a high degree of influence is different according to the characteristic lines relating to the respective multiple combustion conditions. Therefore, based on the combination of the ignition delay times TD obtained by setting the multiple parameters (combustion conditions) to different values, it can be estimated which of the molecular structural species has a high mixing ratio, for example, as shown in FIG. 6.

The molecular structural species A exemplified in FIG. 6 is a molecular structural species having a high degree of influence on the characteristic line (first characteristic line) related to the in-cylinder oxygen concentration (first parameter). In addition, the molecular structural species B is a molecular structural species having a high degree of influence on the characteristic line (second characteristic line) relating to the in-cylinder temperature (second parameter). The molecular structural species C is a molecular structural species having a high degree of influence on the characteristic line (third characteristic line) relating to the third parameter. The molecular structural species A is mixed more, as a change in the ignition delay time TD appears more with respect to a change in the first parameter. In a similar manner, the molecular structural species B are mixed more, as a change in the ignition delay time TD appears more with respect to a change in the second parameter. The molecular structural species B is mixed more, as a change in the ignition delay time TD appears more with respect to a change in the third parameter. Therefore, the mixing ratio of the molecular structural species A, B, C can be estimated for each of the different fuels (1), (2) and (3).

Subsequently, the processing of a program to be executed by the combustion characteristic acquisition unit 81 will be described. The processing is executed each time a pilot injection is commanded.

First, the combustion characteristic acquisition unit 81 estimates the time point t3 of the combustion start based on the detection value of the in-cylinder pressure sensor 21 as described above, and calculates the ignition delay time TD related to the pilot injection. Subsequently, the combustion characteristic acquisition unit 81 stores the ignition delay time TD in association with the multiple parameters (combustion conditions) in the memory 80b.

Specifically, a numerical range, in which the respective parameters can be, is divided into multiple regions in advance, and the combinations of regions of the multiple parameters are set in advance. For example, the ignition delay time TD(i) shown in FIG. 3 represents the ignition delay time TD acquired under the combination of the regions of P(i), T(i), O2(i), and Pc(i). Likewise, the ignition delay time TD(j) represents the ignition delay time TD acquired under the combination of the regions of P(j), T(j), O2(j), and Pc(j).

When it is highly likely that another fuel has been mixed with the fuel stored in the fuel tank due to refueling by a user, it is assumed that the mixing ratio of the molecular structural species has changed and an estimated value of the mixing amount is reset. For example, the estimated value of the mixing amount is reset when an increase in the remaining fuel level is detected by a sensor that detects the remaining fuel level in the fuel tank at the time of stopping the operation of the internal combustion engine 10.

The combustion characteristic acquisition unit 81 substitutes the ignition delay time TD into the determinant of FIG. 3 to calculate the mixing amount for each molecular structural species. The combustion characteristic acquisition unit 81 changes the number of columns of the matrix representing the constant according to the sampling number, that is, the number of rows of the matrix on the right side of the right member of the determinant. Alternatively, the combustion characteristic acquisition unit 81 substitutes a preset nominal value into the matrix of the ignition delay time TD with respect to the ignition delay time TD that has not been acquired. The combustion characteristic acquisition unit 81 calculates the mixing ratio for each molecular structural species based on the mixing amount, which is calculated in this manner for each molecular structural species.

As described above, the microcomputer 80a also functions as the injection control unit 83, the fuel pressure control unit 84, the EGR control unit 85, the supercharging pressure control unit 86, and the intake manifold temperature control unit 87. Those control units set target values on the basis of an engine speed, an engine load, an engine coolant temperature and the like and perform a feedback control so that a control target has a target value. Alternatively, those control units performs an open control according to contents corresponding to the target value.

The injection control unit 83 sets the pulse signal of FIG. 2 so that the injection start timing, the injection amount, and the injection stage number become the target values, thereby to control (injection control) the injection start timing, the injection amount, and the injection stage number. The number of injection stages is the number of injections pertaining to the multistage injection described above. Specifically, the injection control unit 83 stores an ON time (energization time) and a pulse ON rise timing (energization start timing) of the pulse signal corresponding to the target value on a map in advance. The injection control unit 83 acquires the energization time and energization start timing corresponding to the target value from the map and sets a pulse signal.

In addition, the injection control unit 83 stores the output torque generated by the injection, emission state values such as the NOx amount and the PM amount in advance. In setting the target value based on the engine speed, the engine load and the like in next and subsequent injections, the injection control unit 83 corrects the target value based on the values stored as described above. In short, the injection control unit 83 corrects the target value so as to make a deviation between the actual output torque or emission state value, and the desired output torque or emission state value zero, and performs the feedback control.

The fuel pressure control unit 84 controls the operation of a metering valve that controls a flow rate of the fuel drawn into the fuel pump 15p. More specifically, the fuel pressure control unit 84 feedback controls the operation of the metering valve based on the deviation between the actual rail pressure detected with the rail pressure sensor 23 and the target pressure Ptrg (target value). As a result, the discharge amount per unit time by the fuel pump 15p is controlled, and the actual rail pressure is kept at the target value under the control (fuel pressure control).

The EGR control unit 85 sets a target value of the EGR amount based on the engine speed, the engine load, and the like. The EGR control unit 85 controls the EGR amount while controlling (EGR control) the valve opening degree of the EGR valve 17a based on the target value. The supercharging pressure control unit 86 sets a target value of the supercharging pressure based on the engine speed, the engine load, and the like. The supercharging pressure control unit 86 controls the supercharging pressure while controlling (supercharging pressure control) the operation of the supercharging pressure regulator 26 based on the above target value. The intake manifold temperature control unit 87 sets a target value of the intake manifold temperature based on the outside air temperature, the engine speed, the engine load, and the like. The intake manifold temperature control unit 87 controls the intake manifold temperature while controlling (intake manifold temperature control) the valve opening degree of the temperature control valve 17d based on the above target value.

The combustion system includes a fuel injection system constituted by the fuel injection valves 15. The internal combustion engine 10 that is a diesel engine includes four cylinders #1 to #4. The fuel injection system will be described referring to FIGS. 7 and 8.

Figure 7:
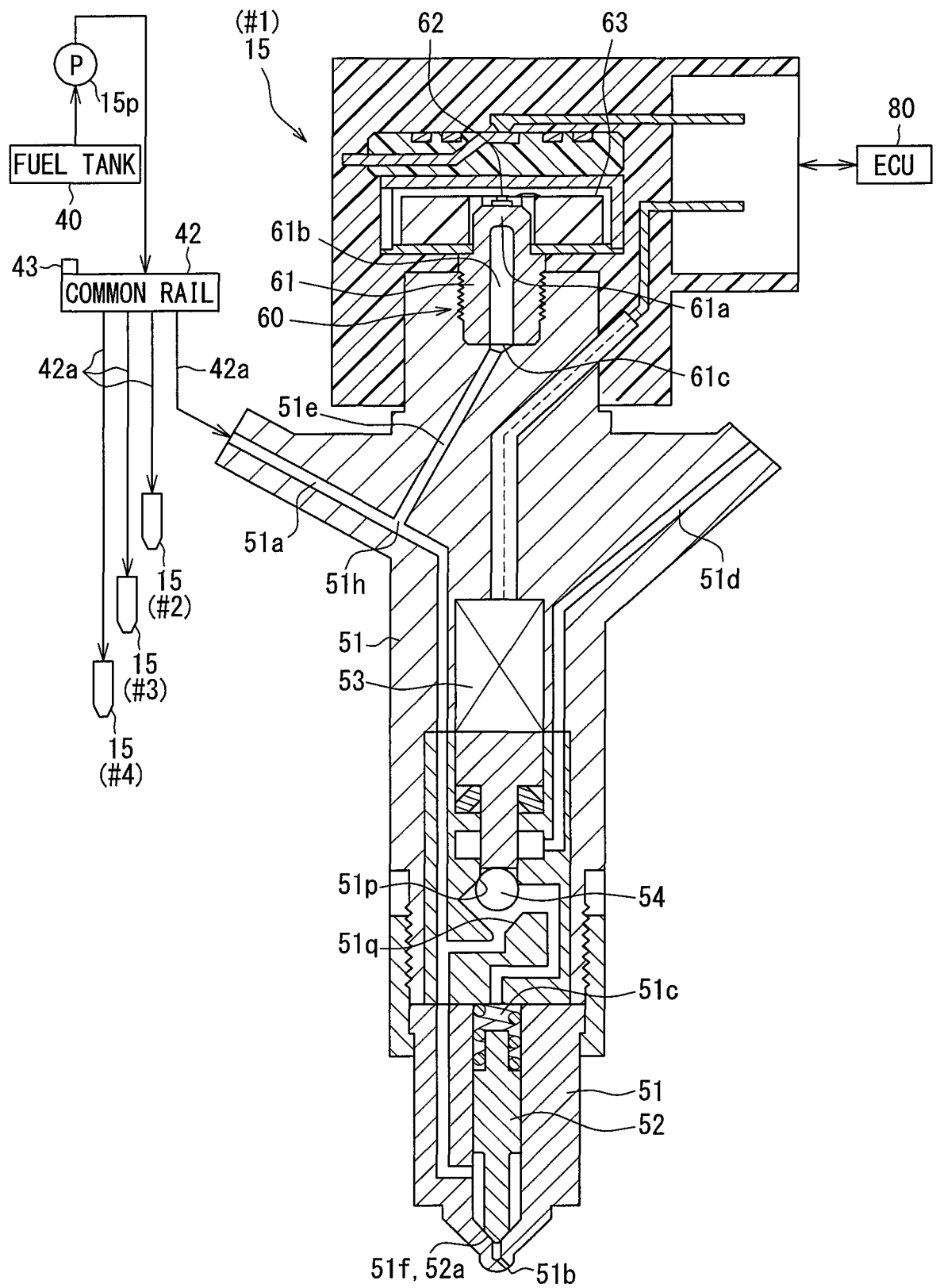
FIG. 7 is a schematic diagram of a fuel injection system included in the combustion system.

As shown in FIG. 7, the fuel in the fuel tank 40 is pumped to and accumulated in the common rail 42 by the fuel pump 15p, and is distributed to the fuel injection valves 15 of cylinders #1 to #4. Each of the fuel injection valves 15 is connected with the common rail 42 through a connection passage 42a. The fuel injection valves 15 sequentially inject the fuel in an order that is previously set. Since a plunger pump is used in the fuel pump 15p, the fuel is intermittently pumped by synchronizing a reciprocation movement of a plunger.

A rail temperature sensor 43 that detects a fuel temperature in the common rail 42 is at the common rail 42. The rail temperature sensor 43 is electrically connected with the ECU 80 and outputs a detection signal to the ECU 80.

The fuel injection valve 15 includes a body 51, a valve body 52, an actuator 53, a control valve 54, a fuel pressure sensor 60, and the like. The valve body 52, the actuator 53 and the control valve 54 is received inside the body 51. The body 51 defines a main passage 51a, an injection hole 51b, a back pressure chamber 51c, a low-pressure passage 51d, a body-side branch passage 51e and a seating surface 51f. For example, the low-pressure passage 51d and the body-side branch passage 51e is formed by a drilling in the body 51. The injection hole 51b is equivalent to a nozzle hole.

The valve body 52 includes a seat surface 52a that is seated on or removed from the seating surface 51f of the body 51. When the valve body 52 is seated on the seating surface 51f, the seat surface 52a closes the main passage 51a. When the valve body 52 is removed from the seating surface 51f, the main passage 51a is opened. The connection passage 42a is connected with the main passage 51a. The connection passage 42a and the main passage 51a constitutes a fuel passage through which the fuel flows from the common rail 42 to the injection hole 51b.

The main passage 51a and the low-pressure passage 51d are connected with the back pressure chamber 51c. The control valve 54 switches between two communication states that are a communication state between the main passage 51a and the back pressure chamber 51c and a communication state between the low-pressure passage 51d and the back pressure chamber 51c.

When the control valve 54 is pressed downwardly in FIG. 7 while the actuator 53 such as an electromagnetic coil, a piezo element, and the like is energized, the control valve 54 is removed from a first seat surface 51p and is seated on a second seat surface 51q, and the back pressure chamber 51c communicates with the low-pressure passage 51d. Then, a fuel pressure in the back pressure chamber 51c decreases, a back pressure force applied to the valve body 52 decreases, and the valve body 52 is opened.

When the control valve 54 is pressed upwardly in FIG. 7 while the actuator 53 is deenergized, the control valve 54 is removed from the second seat surface 51q and is seated on the first seat surface 51p (refer to FIG. 7), the back pressure chamber 51c communicates with the main passage 51a. Then, the fuel pressure in the back pressure chamber 51c increases, the back pressure force applied to the valve body 52 increases, and the valve body 52 is closed.

As the above description, since the ECU 80 controls an energization of the actuator 53, the ECU 80 controls a valve opening operation and a valve closing operation of the control valve 54. Then, the ECU 80 controls the valve opening operation and the valve closing operation of the valve body 52. Thus, a high-pressure fuel supplied from the common rail 42 to the main passage 51a is injected from the injection hole 51b according to the valve opening operation and the valve closing operation of the valve body 52. For example, the ECU 80 calculates an injection start timing, an injection end timing, the injection amount and the like, based on the rotational speed of an engine output shaft, an engine load and the like. The ECU 80 outputs an injection instruction signal to the actuator 53 to control a current state to be a target injection state that is calculated, and controls an operation of the fuel injection valve 15.

The ECU 80 calculates the target injection state based on the engine load and an engine rotational speed that is the rotational speed which are calculated from an accelerator operation amount and the like. For example, the ECU 80 establishes an injection state map indicating an optimal injection state corresponding to the engine load and the engine rotational speed, and previously stores the injection state map in the memory 80b. The injection state that is stored includes an injection stage number, the injection start timing, the injection end timing, the injection amount and the like. The ECU 80 calculates the target injection state by referring to the injection state map, based on the engine load and the engine rotational speed of the present time point.

The ECU 80 sets the injection instruction signal based on the target injection state that is calculated. For example, the ECU 80 establishes an instruction map indicating the injection instruction signal corresponding to the target injection state, and previously stores the instruction map in the memory 80b. The ECU 80 sets the injection instruction signal by referring to the instruction map, based on the target injection state that is calculated. As the above description, the ECU 80 sets the injection instruction signal according to the engine load and the engine rotational speed and outputs the injection instruction signal to the fuel injection valve 15.

The fuel pressure sensor 60 is attached to the body 51 and detects a pressure of the fuel in the body-side branch passage 51e as the fuel pressure. The fuel pressure sensor 60 includes a main body part 61, a pressure sensor element 62, a mold IC 63, and the like. According to the present embodiment, in the fuel injection valve 15, an inner pressure of the body-side branch passage 51e and an inner pressure of the main passage 51a are identical. In the main passage 51a, an inner pressure of an upstream end part of the main passage 51a connected with the connection passage 42a and an inner pressure of a downstream end part communicating with the injection hole 51b are identical. Further, the inner pressure of the main passage 51a and an inner pressure of the connection passage 42a are identical. In this case, the fuel pressure sensor 60 detects the fuel pressures in the main passage 51a and the connection passage 42a by detecting the fuel pressure in the body-side branch passage 51e.

The pressure sensor element 62 and the mold IC 63 are supported by the main body part 61, and the main body part 61 is attached to the body 51. The main body part 61 defines an introduction passage 61b into which the fuel in the body-side branch passage 51e is introduced. The main body part 61 includes a flexible part 61a that elastically deforms when receiving the fuel pressure of the introduction passage 61b. The flexible part 61a is at an end part of the introduction passage 61b in the main body part 61, that is, at a downstream-most part of the introduction passage 61b. The main body part 61 is a bottomed cylindrical shape. A bottom part of the main body part 61 is equivalent to the flexible part 61a, and a cylindrical opening part of the main body part 61 is equivalent to an inlet of the introduction passage 61b.

The pressure sensor element 62 is attached to the flexible part 61a and outputs a pressure detection signal according to an elastic deformation amount of the flexible part 61a. The mold IC 63 includes an amplifier circuit that amplifies the pressure detection signal output from the pressure sensor element 62 and an electric component such as a sending circuit that sends the pressure detection signal and the like, which are molded by a resin.

Next, a detection waveform that is a waveform of the fuel pressure detected by the fuel pressure sensor 60 in the fuel injection will be described referring to FIG. 8.

Figure 8:
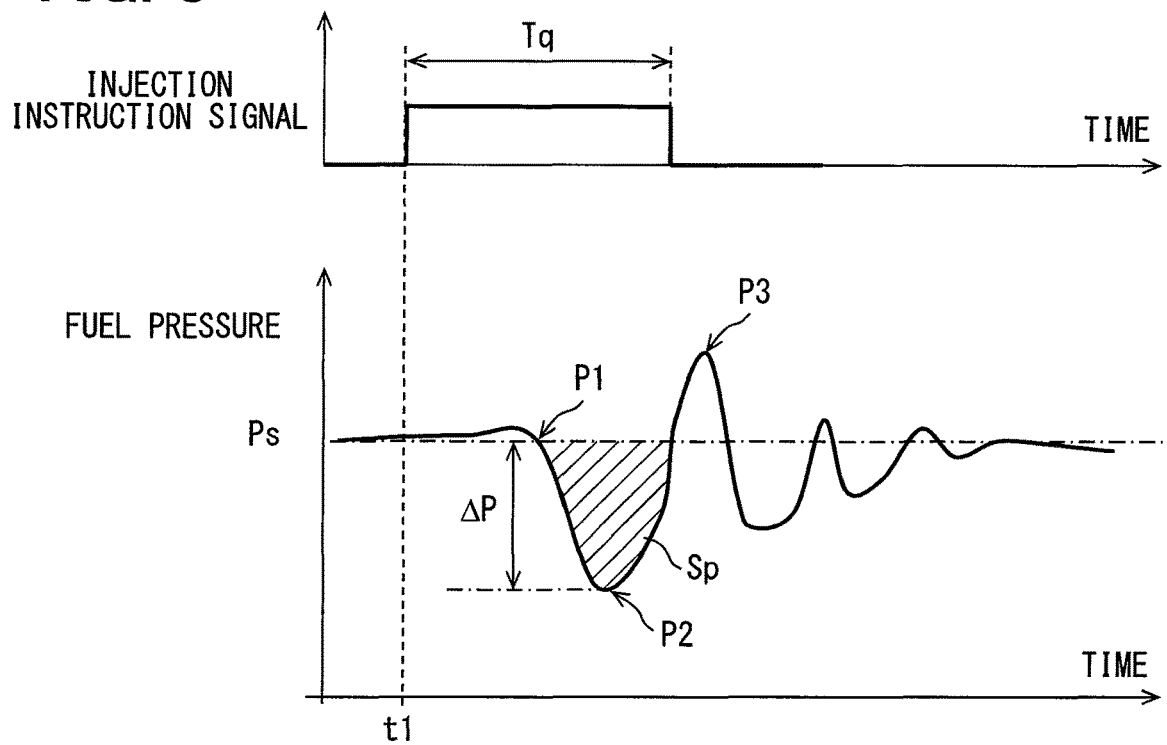
FIG. 8 is a graph illustrating a change of a fuel pressure in response to a fuel injection.

An upper part of FIG. 8 shows the injection instruction signal output from the microcomputer 80a to the actuator 53. The injection instruction signal indicates a pulse signal that is the same as the pulse signal shown in the upper part of FIG. 2. In the fuel injection valve 15, the pulse of the injection instruction signal is on to cause the actuator 53 to activate, and the valve body 52 is opened. In this case, the microcomputer 80a controls the injection amount Q by controlling a valve opening time (injection time) of the injection hole 51b according to an energization period (injection instruction period Tq) of the injection instruction signal.

In the fuel injection valve 15, the control valve 54 activates at a time point t1 that the injection start instruction is generated. Then, when the valve opening operation of the valve body 52 starts after a response delay time has elapsed, the injection of the fuel injected from the injection hole 51b starts. The fuel pressure detected by the fuel pressure sensor 60 starts to decrease at a change point P1 after the injection start instruction is generated. Then, when the injection amount of the fuel injected from the injection hole 51b reaches a maximum value, a decreasing of the fuel pressure stops at a change point P2. In this case, the fuel pressure decreases by a decreasing amount ΔP from a reference pressure Ps before the injection starts to a pressure Pe after the injection stops. The decreasing amount ΔP is likely to increase accordance with an increase in injection amount of the fuel. An area between the fuel pressure and the reference pressure Ps from the change point P1 to a change point P3 is referred to as a decreasing area Sp. In this case, similar to the decreasing amount ΔP, the decreasing area Sp is likely to increase in accordance with an increase in injection amount of the fuel.

Next, the control valve 54 activates while an injection end instruction is generated. Then, when the valve closing operation of the valve body 52 starts after a response delay time has elapsed, the injection amount of the fuel starts to decrease. The fuel pressure starts to increase at the change point t3 after the injection end instruction is generated. Then, an increasing of the fuel pressure stops at the change point P3 while the injection is actually completed that the injection amount of the fuel becomes zero.

As the above description, the fuel pressure decreases while the injection of the fuel injected from the injection hole 51b starts, and the fuel pressure increases while the injection stops. In this case, a change of the fuel pressure and the injection amount have a correlation, and the injection amount can be estimated from a pressure waveform that indicates the change of the fuel pressure. For example, the injection amount of the fuel can be estimated based on the decreasing amount ΔP of the fuel pressure or the decreasing area Sp.

However, the inventors obtain that the injection amount of the fuel injected from the injection hole differs when the decreasing amount ΔP of the fuel pressure or the decreasing area Sp is constant in a case where a mixing ratio for a molecular structural species contained in the fuel differs. The microcomputer 80a according to the present embodiment functions as the injection control unit 83 thereby to execute an injection control processing that performs a control for the fuel injection. In the injection control processing, the injection amount of the fuel is estimated based on the mixing ratio for the molecular structural species. A fuel control processing will be described referring to a flowchart shown in FIG. 9. The above process is repeatedly executed in a predetermined cycle during the operation period of the internal combustion engine 10.

Figure 9:
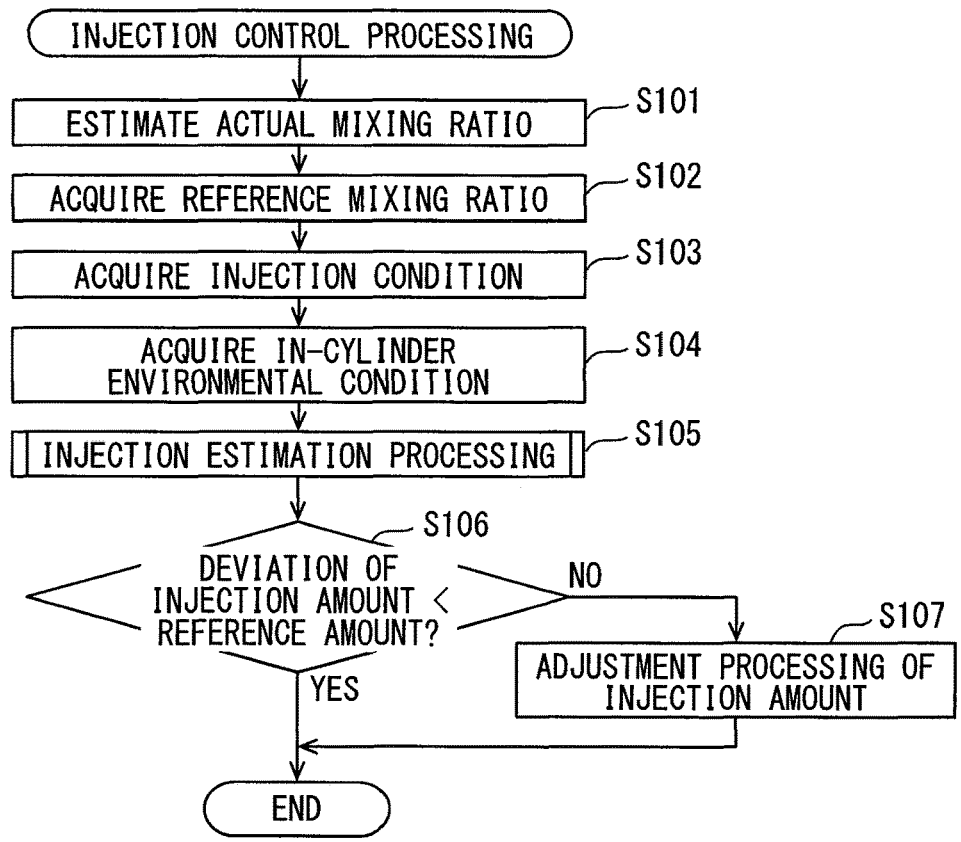
FIG. 9 is a flowchart showing a procedure of injection control processing.

First, in step S101 of FIG. 9, the mixing ratio (an actual mixing ratio) estimated with the mixing ratio estimation unit 82 is acquired. In other words, the mixing ratio for each molecular structural species shown on the left side of FIG. 3 is acquired. On the other hand, a reference value (reference mixing ratio) of the mixing ratio for each molecular structural species is set in advance and stored in the memory 80b. Those reference mixing ratios are set in consideration of the fuel that is distributed in countries or regions where the vehicle device is used. At the present step S101, grouped molecular structural species, such as linear paraffins, side chain paraffins, naphthenes, and aromatics, are estimated. Step S101 corresponds to a mixing acquisition unit.

In step S102, the reference mixing ratio is read from the memory 80b and acquired. In step S103, an injection condition on the fuel injection is acquired. Examples of the injection conditions include a rail pressure, which is a fuel pressure in the common rail 42, a target injection amount, which is a target value of the injection amount, an energization period for the fuel injection valve 15, a needle lift amount of the fuel injection valve 15, a fuel temperature in the common rail 42, the fuel pressure in the fuel injection valve 15, and the like.

At step S104, in-cylinder environmental conditions when a fuel injection is performed are acquired. Examples of the in-cylinder environmental conditions include the in-cylinder temperature, which is the temperature of the combustion chamber 11a, the in-cylinder oxygen concentration, which is the oxygen concentration of the combustion chamber 11a, the in-cylinder flow rate, which is the flow rate of the air-fuel mixture in the combustion chamber 11a. The in-cylinder temperature is also included in the combustion conditions. Further, the in-cylinder oxygen concentration is acquired based on the intake oxygen concentration included in the combustion conditions.

In step S105, injection estimation processing is executed. The injection estimation processing will be described referring to the flowchart of FIG. 10.

Figure 10:
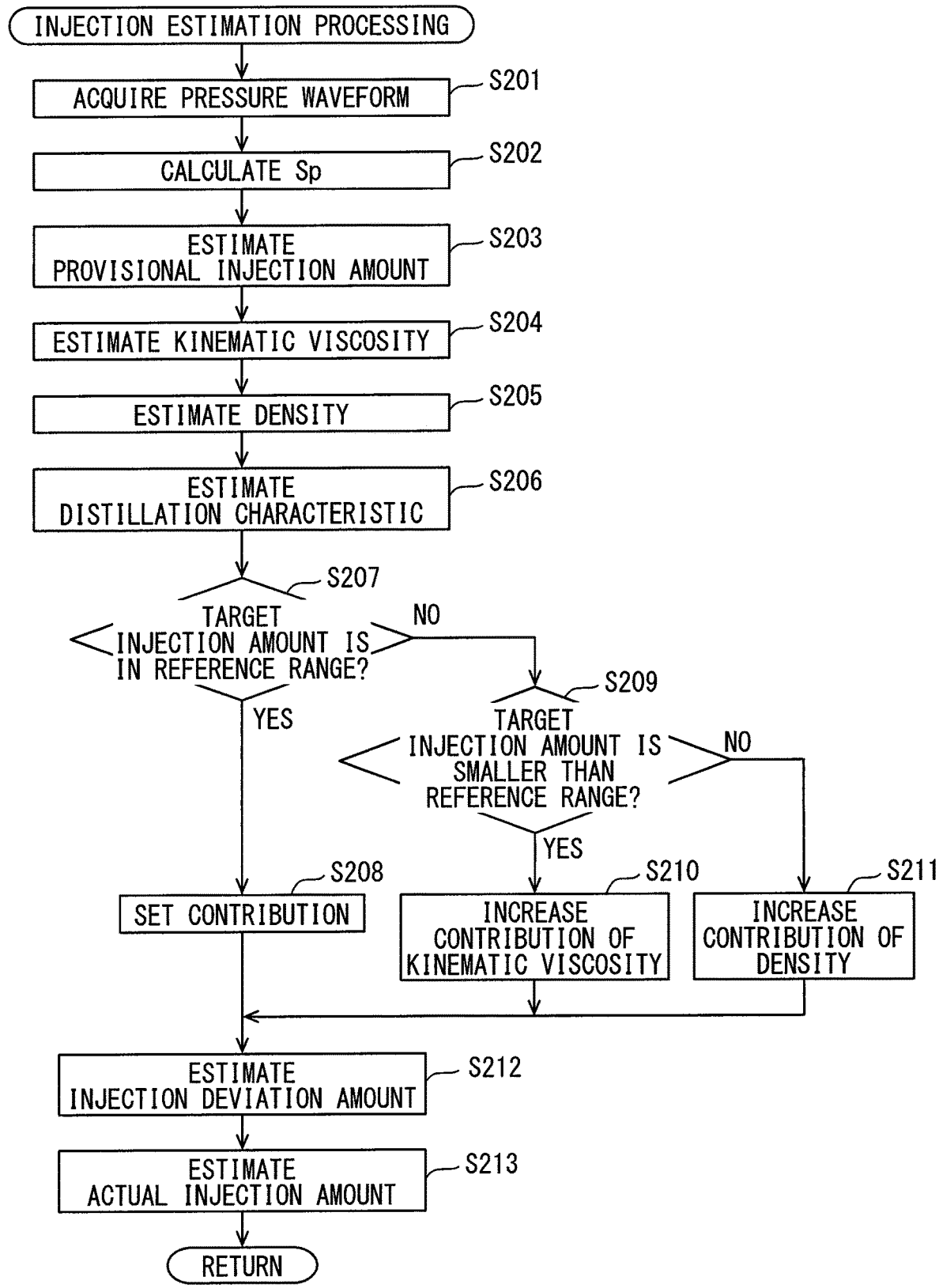
FIG. 10 is a flowchart showing a procedure of injection estimation processing.

In step S201 of FIG. 10, the pressure waveform of the fuel pressure is acquired based on the detection signal of the fuel pressure sensor 60. In step S202, the decreasing area Sp is calculated based on the pressure waveform. In step S203, a provisional injection amount is estimated based on the decreasing area Sp. In this case, a correlation data between the decreasing area Sp and the injection amount in a reference fuel having the reference mixing ratio is previously acquired by a test according to an in-cylinder environment, and the correlation data is stored in the memory 80b. When the injection amount when the reference fuel is used is referred to as the provisional injection amount, the correlation data when the reference fuel is used is read from the memory 80b, and the provisional injection amount is estimated from the decreasing area Sp by using the correlation data when the reference fuel is used.

In steps S204 to S206, a fuel characteristic including a kinematic viscosity, a density and a distillation characteristic is estimated based on an actual mixing ratio in an actual fuel having the actual mixing ratio. In step S204, the kinematic viscosity of the actual fuel is estimated. In step S205, the density of the actual fuel is estimated. In the above processes, for example, the kinematic viscosity and the density are estimated by using a mathematical function, a regression model or a map for the actual mixing ratio. The kinematic viscosity, the density and the distillation characteristic are general properties of the fuel. The fuel characteristic includes an HC ratio that is a ratio between a hydrogen number and a carbon number and the like in addition of general properties.

In steps S204 and S205, the kinematic viscosity and the density that are estimated based on the actual mixing ratio are corrected according to a detection result of the rail temperature sensor 43. In this case, the fuel temperature at an upstream end of the main passage 51a is estimated based on the detection signal of the rail temperature sensor 43, and correction amounts of the kinematic viscosity and the density are estimated based on the fuel temperature. For example, the correction amounts of the kinematic viscosity and the density are set to make the kinematic viscosity and the density decrease in accordance with an increase in fuel temperature. Step S204 corresponds to a kinematic viscosity estimation unit, and step S205 corresponds to a density estimation unit.

In step S206, multiple distillation characteristics in the actual fuel are estimated based on the actual mixing ratio. In this case, similar to step S204, the distillation characteristics are estimated by using a mathematical function, a regression model or a map for the actual mixing ratio. As shown in FIG. 11, when distillation characteristics T50 where 50% of the fuel evaporates are identical in fuels A1 and A2 in a case where the fuels A1 and A2 are used as actual fuels, a distillation characteristic T10 or at a distillation characteristic T90 may be different in the fuels A1 and A2. Thus, by estimating the multiple distillation characteristics of the actual fuel, an estimation precision of a volatility of the actual fuel is improved. In addition, the distillation characteristic T50 per se may be remarkably different in the fuel A1 or the fuel A2.

In steps S207 to S212, a "deviation" of the injection amount due to the actual mixing ratio is estimated as an injection deviation amount in a case where the provisional injection amount is used as a reference. In step S207, it is determined whether the target injection amount is in a reference range or not. During the injection of the fuel, the needle lift amount of the fuel injection valve 15 and the energization period are set according to the target injection amount. In this case, it is determined whether the target injection amount is in the reference range or not by determining whether the needle lift amount is in a reference range or not. Examples of the reference range include the target injection amount or the needle lift amount when an output of the internal combustion engine 10 is in a middle level in case where the output of the internal combustion engine 10 is in one of a high level, the middle level and a low level.

When the target injection amount is in the reference range, the process proceeds to step S208, and a contribution of the fuel characteristic is set after the injection deviation amount is estimated. In this case, as shown in FIG. 12, the injection deviation amount is estimated based on the fuel characteristics including the density, the kinematic viscosity, and the multiple distillation characteristics, and based on the injection conditions including the fuel temperature, the fuel pressure, the energization period and the needle lift amount. The injection deviation amount is influenced by the injection conditions, and can be estimated with a model such as a multivariate regression model shown in FIG. 13 and the like. In a mathematical formula shown in FIG. 13, the injection deviation amounts $\Delta Q1, \Delta Q2, \Delta Q3, \ldots$, which corresponds to the injection conditions, are estimated based on a coefficient b that is previously set and the fuel characteristics including the kinematic viscosity and the like. The coefficient b includes x rows and y columns and is, for example, a matrix having numerical values b00 . . . bXY.

In the mathematical formula, the coefficient b is the contribution of the fuel characteristic relating to the injection deviation amount. In step S208, the coefficient b is set based on the injection conditions. In this case, when the target injection amount is in the reference range, a map, a model or a mathematical function indicating a correlation between the injection conditions and the coefficient b is stored in the memory 80b, and the coefficient b is set according to the injection conditions in each fuel injection by using the map, the model or the mathematical function.

After step S208, the process proceeds to step S212, and the injection deviation amount is estimated based on the fuel characteristic of the actual fuel and the contribution by using the model shown in FIG. 13. In step S213, the actual injection amount actually injected from the injection hole 51b is estimated by using the provisional injection amount and the injection deviation amount. In this case, the provisional injection amount is corrected by the injection deviation amount, and then the actual injection amount is calculated. Step S213 corresponds to an injection amount estimation unit.

When it is determined that the target injection amount is in the reference range in step S207, the process proceeds to step S209, and it is determined whether the target injection amount is smaller than the reference range or not. In this case, when the target injection amount or the needle lift amount becomes a magnitude that the output of the internal combustion engine 10 is in the low level, the target injection amount is smaller than the reference range. When the target injection amount is smaller than the reference range, the process proceeds to step S210. A minimum value of the reference range is equivalent to a lower-side reference value. When the target injection amount is smaller than the lower-side reference value, the target injection amount is smaller than the reference range.

In step S210, the coefficient b is set such that the contribution of the kinematic viscosity in the fuel characteristics becomes greater than the contribution in a case where the target injection amount is in the reference range, for an estimation of the injection deviation amount. When the needle lift amount is smaller than the reference range, a gap between the seating surface 51f of the body 51 and the seat surface 52a of the valve body 52 is relatively small. Thus, a passing easiness of the fuel relating to the gap is more likely influenced by the kinematic viscosity of the fuel than the density of the fuel. In this case, since the contribution of the kinematic viscosity is increased, a dependability and an influence of the kinematic viscosity relating to an estimation value of the injection deviation amount is increased. When the target injection amount is smaller than the reference range, a map, a model or a mathematical function indicating a correlation between the injection conditions and the coefficient b is stored in the memory 80b, and the coefficient b is set according to the injection conditions in each fuel injection by using the map and the like.

When the target injection amount is not in the reference range and is not smaller than the reference range, it is determined that the target injection amount is greater than the reference range, and the process proceeds to step S211. A maximum value of the reference range is equivalent to an upper-side reference value. When the target injection amount is greater than the upper-side reference value, the target injection amount is greater than the reference range.

In step S211, the coefficient b is set such that the contribution of the density in the fuel characteristics becomes greater than the contribution in a case where the target injection amount is in the reference range, for the estimation of the injection deviation amount. When the needle lift amount is greater than the reference range, the gap between the seating surface 51f and the seat surface 52a is relatively large. Thus, the passing easiness of the fuel relating to the gap is unlikely influenced by the kinematic viscosity of the fuel, and the injection amount becomes larger. Then, an injection mass deviation becomes remarkable due to a density deviation. When the target injection amount is greater than the reference range, a map, a model or a mathematical function indicating the correlation between the injection conditions and the coefficient b is stored in the memory 80b, and the coefficient b is set according to the injection conditions in each fuel injection by using the map and the like.

After steps S210 and S211, similar to step S212 after step S208, the injection deviation amount is estimated in step S212. In step S213, the actual injection amount is estimated. Step S210 corresponds to a kinematic viscosity distribution unit, and step S211 corresponds to a density distribution unit.

Returning to FIG. 9, after the injection estimation processing, in step S106, the injection amount of the reference fuel is read from the memory 80b, and a "deviation" between the injection amount of the reference fuel and the actual injection amount of the actual fuel is calculated as the difference. Thus, it is determined whether the difference is smaller than a reference amount that is previously set or not. The difference in this case is an absolute value of the difference between the injection amount of the reference fuel and the actual injection amount of the actual fuel.

When the difference of the injection amount is smaller than the reference amount, the process proceeds to step S107, an adjustment processing of the injection amount is performed such that the difference becomes smaller than the reference amount. In the adjustment processing, a processing is performed to increase or decrease the energization period of the fuel injection valve 15. When the actual injection amount is smaller than the injection amount of the reference fuel, an increasing processing is performed to increase the injection amount by increasing the energization period. When the actual injection amount is greater than the injection amount of the reference fuel, a decreasing processing is performed to decrease the injection amount by decreasing the energization period. The decreasing area Sp of the fuel injection increases when the increasing processing is performed and decreases when the decreasing processing is performed.

In the adjustment processing of the injection amount, the target value is set based on the actual mixing ratio such that the difference of the injection amount becomes smaller than the reference amount. In that case, a provisional target value is acquired based on the reference mixing ratio, and the provisional target value is corrected with the use of the actual mixing ratio to calculate the target value. For example, in the increasing processing, the provisional target value is calculated by increasing or decreasing the actual injection amount by the difference, and the provisional target value is corrected with the use of the actual mixing ratio to calculate the target value. Thus, it is restricted that the injection amount is insufficient due to the actual mixing ratio although the processing of increasing the injection amount has been performed.

When the difference of the injection amount is smaller than the reference amount, it is determined that the processing of adjusting the injection amount is unnecessary, and the present injection control processing is terminated.

When a difference of an ignition timing is smaller than a reference period, it is determined that a processing of adjusting the ignition timing is unnecessary, and the present injection control processing is terminated. Step S107 corresponds to a combustion control unit.

As follows, operational effects of the first embodiment described above will be described.

According to the first embodiment, the injection amount of the fuel injected from the injection hole 51b is estimated based on both the actual mixing ratio and the fuel pressure. Thus, when a variation of the injection amount occurs due to the actual mixing ratio while the fuel pressure in the fuel injection valve 15 is constant, the variation can be grasped appropriately. Thus, an estimation precision of an estimation of the injection amount can be improved by using the actual mixing ratio.

According to the first embodiment, since the kinematic viscosity of the actual fuel is estimated based on the actual mixing ratio, by comparing with a case where the kinematic viscosity is detected by a property sensor including a kinematic viscosity sensor and the like, for example, an acquisition precision of the kinematic viscosity can be improved. Further, since the actual mixing ratio is indirectly used by the kinematic viscosity in the estimation of the injection amount, by comparing with a configuration where the actual mixing ratio is directly used in the estimation of the injection amount, an establishment difficulty of a map, a model or a mathematical function of estimating the injection amount can be decreased.

According to the first embodiment, when the target injection amount is smaller than the reference range, the distribution of the kinematic viscosity in the estimation of the injection deviation amount is set to be high. Thus, by comparing with a configuration where the distribution of the kinematic viscosity is set to be constant without respect to a magnitude of the target injection amount, the estimation precision of the injection deviation amount can be improved.

According to the first embodiment, since the density of the actual fuel is estimated based on the actual mixing ratio, by comparing with a case where the density is detected by a property sensor including a density sensor and the like, for example, an acquisition precision of the density can be improved. Further, since the actual mixing ratio is indirectly used by the density in the estimation of the injection amount, by comparing with a configuration where the actual mixing ratio is directly used in the estimation of the injection amount, an establishment difficulty of a map, a model or a mathematical function of estimating the injection amount can be decreased.

According to the first embodiment, when the target injection amount is greater than the reference range, the distribution of the density in the estimation of the injection deviation amount is set to be high. Thus, by comparing with a configuration where the distribution of the density is set to be constant without respect to a magnitude of the target injection amount, the estimation precision of the injection deviation amount can be improved.

According to the first embodiment, since the adjustment processing of the injection amount is performed based on the actual mixing ratio, it can be restricted that the deviation of the injection amount is not in the reference amount although the adjustment processing is performed. Thus, in a configuration where the estimation precision of the injection amount is improved by using both the fuel pressure and the actual mixing ratio, Second Embodiment According to the first embodiment, the actual injection amount is estimated based on the actual mixing ratio every time that the fuel injection is performed. According to a second embodiment, an injection index is established by using the estimation result of the actual injection amount, and the actual injection amount is estimated based on the injection index. Then injection estimation processing of the present embodiment will be described referring to FIGS. 14 and 15.

Figure 14:
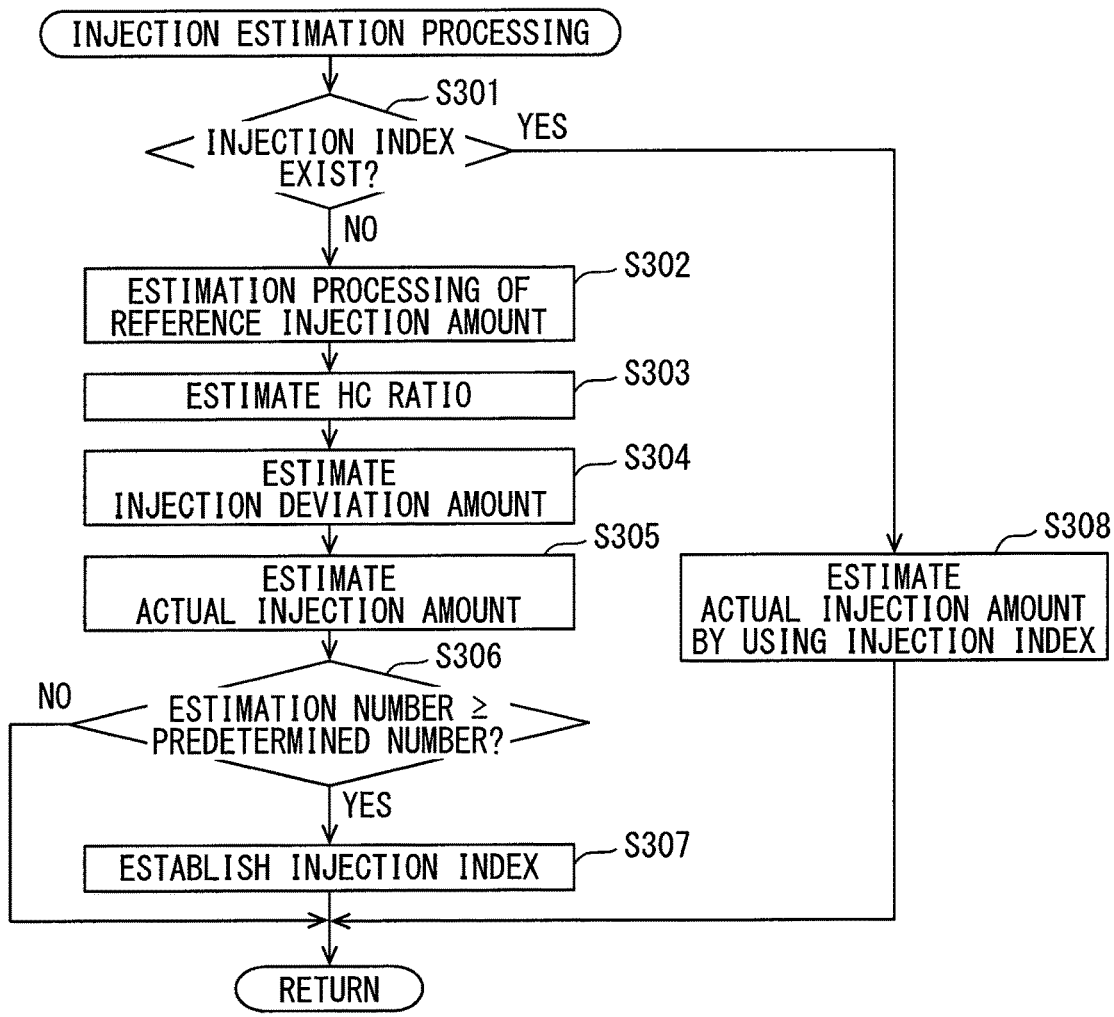
FIG. 14 is a flowchart showing a procedure of injection estimation processing according to a second embodiment.

As shown in FIG. 14, in step S301, it is determined whether the injection index has established or not. In this case, the injection index is cleared every time that a start switch of the vehicle or an ignition switch of the vehicle is off, and is established every time that the start switch or the ignition switch is on. When a renewed injection index has not been established right after the start switch or the ignition switch is on, it is determined that the injection index does not exist, and the process proceeds to step S302. The injection index may be cleared every time that the engine stops. In this case, the injection index is established every time that the engine starts.

In step S302, an estimation processing of the provisional injection amount is executed. The processing is the same processing as steps S201 to S203 in the first embodiment. In step S303, the HC ratio is estimated as an intermediate parameter, based on the actual mixing ratio. In this case, the HC ratio is estimated by using a mathematical function, a regression model or a map relating to the actual mixing ratio. In the fuel, the kinematic viscosity or the density increases in accordance with a decrease in HC ratio. Specifically, it is likely that the injection becomes smaller although the fuel pressure is constant in a condition that the injection period is short in a case where the instruction injection amount is small. Step S303 corresponds to an HC ratio estimation unit.

In steps S304 and S305, similar to steps S212 and S213 in the first embodiment, the injection deviation amount and the actual injection amount are estimated, and the actual injection amount is stored in the memory 80b. In this case, similar to the first embodiment, the distribution of the fuel characteristic for estimating the injection deviation amount is set based on the injection condition. The injection condition does not include the target injection amount. Thus, the coefficient b is set without respect to the target injection amount. Step S305 corresponds to an injection amount estimation unit.

In step S306, it is determined whether an estimation number of the actual injection amount is greater than or equal to a predetermined number that is previously set or not. According to the present embodiment, the predetermined number is set to two. However, the predetermined number may be three or more. When the present injection estimation processing is executed for twice after the start switch of the vehicle or the ignition switch of the vehicle is on, it is determined that the estimation number is greater than or equal to the predetermined number, and the process proceeds to step S307.

Figure 15:
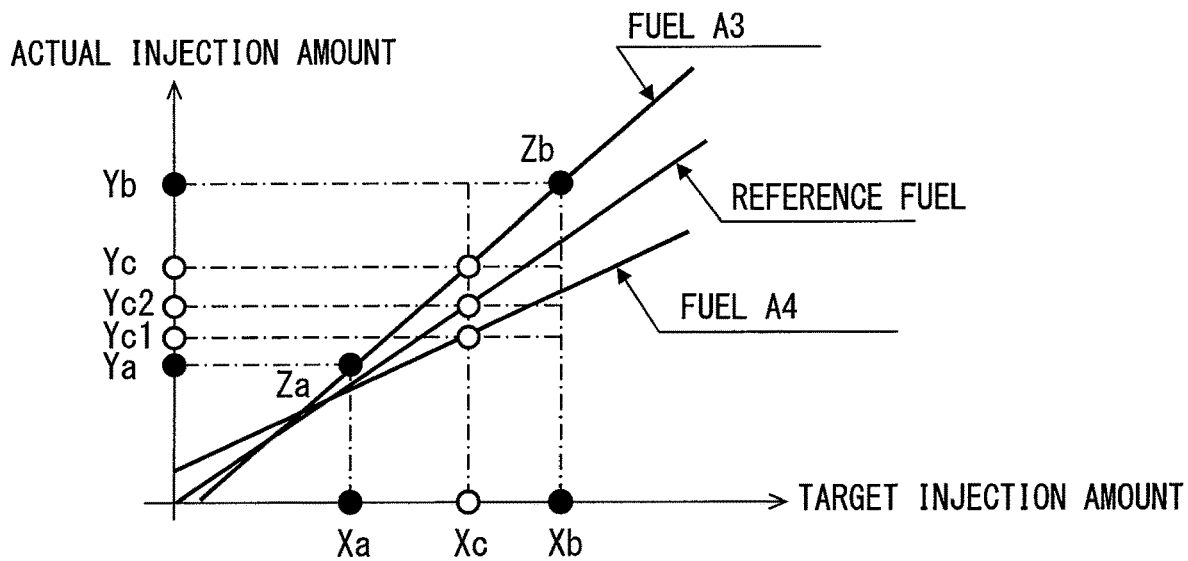
FIG. 15 is a diagram showing an injection index.

In step S307, the injection index shown in FIG. 15 is established by using the actual injection amounts of the predetermined number. First, the target injection amount of every execution of the injection estimation processing and the actual injection amount corresponding to the target injection amount are acquired and plotted. For example, when the target injection amount Xa and the actual injection amount Ya in a first execution and the target injection amount Xb and the actual injection amount Yb in a second execution for the fuel A3 are acquired, two execution points Za and Zb are plotted. By linking the execution points Za and Zb, the injection index of the fuel A3 is established. Step S307 corresponds to an index establishment unit.

For example, in step S306, when the predetermined number is set to ten, ten execution points are plotted, and the injection index of a straight line of a curved line that links the execution points is established. FIG. 15 shows the injection index of the fuel A4 and the injection index of the reference fuel in addition of the injection index of the fuel A3. Further, for the fuel A4 and the reference fuel, similar to the fuel A3, multiple execution points are plotted, and the injection index is established based on the execution points.

When it is determined that the injection index exists in step S301, it is determined that the estimation number of the actual injection amount is greater than or equal to three, and the process proceeds to step S308 and the actual injection amount is estimated by using the injection index. In this case, the actual injection amount is estimated by using the injection index, based on the target injection amount that is acquired as the injection condition. For example, when the target injection amount of the fuel A3 is Xc, the actual injection amount is estimated to be Yc by using the injection index of the fuel A3 shown in FIG. 15.

When the fuel A4 and the reference fuel are used as the actual fuel, the actual injection amount can be estimated from the target injection amount by establishing the injection indexes for the fuel A4 and the reference fuel. For example, when the target injection amount is Xc, the actual injection amount of the fuel A4 can be estimated to be Yc1, and the actual injection amount of the reference fuel can be estimated to be Yc2.

According to the second embodiment, since the injection index of the actual fuel is established, the actual injection amount can be estimated by using the injection index after the injection index has established. In this case, since it is unnecessary to execute a calculation using the actual mixing ratio for the estimation of the actual injection amount in all the injections, a processing load for estimating the actual injection amount can be reduced. Further, since the actual mixing ratio is used in an establishment of the injection index, the estimation precision of the injection amount using the injection index can be maintained appropriately.

According to the second embodiment, since the HC ratio of the actual fuel is estimated based on the actual mixing ratio, comparing with a case where the HC ratio is estimated based on the kinematic viscosity of the fuel or the density of the fuel, for example, an estimation precision of the HC ratio can be improved. Further, since the actual mixing ratio is indirectly used by the HC ratio in the estimation of the injection amount, comparing with a configuration where the actual mixing ratio is directly used in the estimation of the injection amount, an establishment difficulty of a map, a model or a mathematical function of estimating the injection amount can be decreased.

Other Embodiments

The disclosure is not at all limited to the preferred embodiments of the disclosure described above and can be implemented in various modified forms as exemplified below. Not only combination between the elements explicitly specified in each of the embodiments to be capable of being combined with each other but also partial combination between the embodiments can be conducted even without explicit expression insofar as the combination is not particularly hindered.

As a modification 1, the mixing ratio estimation unit 82 may not estimate the mixing ratio of the molecular structural species based on the multiple combustion characteristic values, but may detect the general property of the fuel with a sensor, and estimate the mixing ratio based on the detection result. Specific examples of the above general properties include a fuel density, a kinematic viscosity, a distillation temperature, and the like.

Further, the mixing ratio may be estimated based on both of the estimation result with the mixing ratio estimation unit 82 and the detection result of the sensor. For example, the mixing ratio estimated based on one of the estimation result and the detection result may be corrected based on the other. In addition, the mixing ratio may be estimated with different methods depending on the molecular structural species. For example, the mixing ratio of the first molecular structural species is estimated based on the estimation result of the mixing ratio estimation unit 82, and the mixing ratio of the second molecular structural species is estimated based on the detection result of the sensor.

As a modification 2, instead of estimating the mixing ratio of the molecular structural species contained in the fuel, a mixing ratio of components such as hydrogen, carbon, sulfur, nitrogen, and oxygen contained in the fuel may be estimated. For example, an average number of carbon atoms, an average number of hydrogen atoms, an HC ratio which is the ratio of the number of hydrogen atoms to the number of carbon atoms, and the like can be taken as the mixing ratio for hydrogen and carbon. In the present configuration, injection parameters such as the injection amount and combustion parameters such as the combustion amount are estimated based on the mixing ratio of various components. In this way, even in a case where components contained in the actual fuel differ from each other or where the mixing ratio of the components differ, the combustion state caused by fuel injection can be estimated appropriately. The fuel component such as the average number of carbon atoms can also be referred to as an intermediate parameter.

As a modification 3, the adjustment processing of step S107 may be executed without respect to the actual mixing ratio, that is, the adjustment processing may be not executed based on the actual mixing ratio. For example, according to the first embodiment, after the injection amount is estimated based on the actual mixing ratio in step S105, in step S107, the target injection amount for adjusting the injection amount is set without respect to the actual mixing ratio.

As a modification 4, in the first embodiment, the reference values when the distribution of the kinematic viscosity and the distribution of the density in the estimation of the injection deviation amount may be identical. For example, the output of the internal combustion engine 10 is in one of the high level and the low level, the reference value is on a boundary between the high level and the low level. When the target injection amount is smaller than the reference value, the distribution of the kinematic viscosity is increased comparing with a case where the target injection amount is greater than the reference value.

As a modification 5, in the first embodiment, the distribution of the kinematic viscosity and the distribution of the density may be variably set according to the target injection amount when the actual injection amount is estimated. In this case, since the actual injection amount is still estimated based on the actual mixing ratio, the estimation precision can be maintained appropriately.

As a modification 6, in the first embodiment, the actual injection amount may be estimated by directly using the actual mixing ratio and the fuel pressure, without correcting the provisional injection amount by the injection deviation amount. For example, the actual injection amount is estimated based on the decreasing are Sp, the general property including the kinematic viscosity and the like, and the distribution.

As a modification 7, the injection amount may not be individually estimated for each of the actual mixing ratio and the reference mixing ratio. For example, the difference between the actual mixing ratio and the reference mixing ratio is calculated, and the difference of the injection amount is estimated according to the difference. In this case, the "deviation" between the injection amount of the reference fuel and the injection amount of the actual fuel is directly estimated.

As a modification 8, the injection amount may be estimated without using the general property such as the kinematic viscosity, the density and the like. For example, the injection amount is directly estimated by using a mathematical function, a regression model or a map relating to the actual mixing ratio. In this case, the actual mixing ratio of the fuel can be used in the estimation of the injection amount.

As a modification 9, a property sensor for detecting a general property of a fuel may be provided. For example, a fuel tank or a common rail is provided with the property sensor for detecting a kinematic viscosity and a density of the fuel. In this configuration, the average number of carbon atoms and the average number of hydrogen atoms of the fuel and the HC ratio may be estimated based on the detection result of the property sensor.

As a modification 10, the in-cylinder temperature may be estimated based on the in-cylinder pressure detected with the in-cylinder pressure sensor 21, instead of being detected with the temperature detection element 21a. More specifically, the in-cylinder temperature is calculated according to the in-cylinder pressure, the cylinder capacity, a gas weight in the cylinder, and a gas constant for estimation.

As a modification 11, the unit and/or the function produced with the ECU 80 as the estimation device and the control device of the combustion system can be produced with software stored in a substantive storage medium and a computer executing the software, with software alone, with hardware alone, or with a combination of the software and the hardware. In a case where the combustion system control device is produced with a hardware circuit, for example, it can be produced with an analog circuit or a digital circuit including multiple logic circuits.

As a modification 12, the fuel pressure sensor 60 may directly detect the fuel pressure in the main passage 51a or in the connection passage 42a. For example, the fuel pressure sensor 60 may be independent (separated) from the fuel injection valve 15.

The combustion system to which the estimation device 80 by above-described first disclosure is applied includes a pressure-accumulation vessel (common rail) 42, which is to accumulate a fuel used for combustion in an internal combustion engine, a fuel injection valve (fuel injection valve) 15, which is to inject the fuel from a nozzle hole (injection hole) 51b, a fuel passage 42b, 51a, which is to lead the fuel from the pressure-accumulation vessel to the nozzle hole, and a fuel pressure sensor 60, which is to detect a fuel pressure in the fuel passage. The estimation device 80 applicable to the combustion system includes a mixing acquisition unit S101 and an injection amount estimation unit S213, S305. The mixing acquisition unit S101 acquires a mixing ratio of various components contained in a fuel used for combustion in the internal combustion engine. The injection amount estimation unit S213, S305 estimates an injection amount of the fuel from the nozzle hole according to a change mode of the fuel pressure, which is detected with the fuel pressure sensor and associated with injection of the fuel from the nozzle hole, and the mixing ratio acquired with the mixing acquisition unit.

According to the first disclosure, the injection amount of the fuel injected from the nozzle hole is estimated based on both the actual mixing ratio and the fuel pressure of various components contained in the fuel. Thus, when the injection amount of the fuel injected from the injection hole differs when a change mode of the fuel pressure in response to the injection of the fuel injected from the injection hole is constant in case where components contained in the fuel differ or in a case where mixing ratios of the components differ, the variation can be grasped appropriately. For example, in the fuel, the kinematic viscosity or the density increases in accordance with a decrease in HC ratio that is a ratio between a hydrogen number and a carbon number. Specifically, it is likely that the injection becomes smaller although the fuel pressure is constant in a condition that the injection period is short in a case where the instruction injection amount is small. In the fuel, the kinematic viscosity or the density decreases in accordance with an increase in HC ratio. Specifically, it is likely that the injection becomes greater in a condition that the injection period is short in a case where the instruction injection amount is small. When the injection period is long, the above tendencies are reversed. Thus, since the mixing ratios of the various components of the fuel are used in the estimation of the injection amount, the estimation precision can be improved.

The combustion system to which the estimation device 80 by above-described second disclosure is applied includes a pressure-accumulation vessel 42, which is to accumulate a fuel used for combustion in an internal combustion engine, a fuel injection valve 15, which is to inject the fuel from a nozzle hole (injection hole 51b), a fuel passage 42b, 51a, which is to lead the fuel from the pressure-accumulation vessel to the nozzle hole, and a fuel pressure sensor 60, which is to detect a fuel pressure in the fuel passage. The estimation device 80 applicable to the combustion system includes a mixing acquisition unit S101, an injection amount estimation unit S213, S305, and a combustion control unit S107. The mixing acquisition unit S101 acquires a mixing ratio of various components contained in a fuel used for combustion in the internal combustion engine. The injection amount estimation unit S213 and S305 estimates the injection amount of the fuel from the nozzle hole according to a change mode of the fuel pressure, which is detected with the fuel pressure sensor and associated with injection of the fuel from the nozzle hole, and the mixing ratio acquired with the mixing acquisition unit. The combustion control unit S107 controls the combustion system according to an estimation result of the injection amount estimation unit.

According to the second disclosure, the same advantages as those in the first disclosure can be obtained.

The present disclosure has been described with reference to the examples, but the present disclosure is not limited to the examples or the structures. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. A combustion system, comprising:
an internal combustion engine, including
a common rail configured to accumulate a fuel used for combustion in the internal combustion engine,
a fuel injection valve having a nozzle hole, the fuel injection valve being configured to inject the fuel from the nozzle hole, and
a fuel passage configured to carry the fuel from the common rail to the nozzle hole;
a fuel pressure sensor configured to detect a fuel pressure in the fuel passage;
at least a first sensor configured to detect a combustion characteristic value or a fuel characteristic value; and
a controller coupled to the fuel pressure sensor and the first sensor, the controller including a processor and a memory storing program instructions that, when executed by the processor, cause the processor to:
estimate, based on the combustion characteristic value or the fuel characteristic value detected by at least the first sensor, a mixing ratio of various components contained in the fuel used for combustion in the internal combustion engine;
estimate an injection amount of the fuel from the nozzle hole for a particular injection, based on a combination of:
a change mode of the fuel pressure acquired from the fuel pressure sensor in association with the particular injection, and
the mixing ratio of the various components contained in the fuel, and
control an energization period of the fuel injection valve based on the estimated injection amount.

2. The combustion system according to claim 1, wherein the memory has stored therein further program instructions that, when executed by the processor, cause the processor to
estimate a kinematic viscosity of the fuel according to the mixing ratio, and
wherein said estimating the injection amount based on the mixing ratio includes estimating the injection amount based on the estimated kinematic viscosity of the fuel.

3. The combustion system according to claim 2, wherein the memory has stored therein further program instructions that, when executed by the processor, cause the processor to calculate a coefficient value for the estimated kinematic viscosity based on a comparison between a target injection amount of the particular injection and a predetermined reference value, and
wherein the coefficient value is calculated such that a contribution degree of the estimated kinematic viscosity with respect to the estimated injection amount is greater when the target injection amount is lower than the reference value.

4. The combustion system according to claim 1, wherein the memory has stored therein further program instructions that, when executed by the processor, cause the processor to estimate the density of the fuel according to the mixing ratio, and
wherein said estimating the injection amount based on the mixing ratio includes estimating the injection amount based on the estimated fuel density.

5. The combustion system according to claim 4, wherein the memory has stored therein further program instructions that, when executed by the processor, cause the processor to calculate a coefficient value for the estimated fuel density based on a comparison between a target injection amount of the particular injection and a predetermined reference value, and
wherein the coefficient value is calculated such that a contribution degree of the estimated fuel density with respect to the estimated injection amount is greater when the target injection amount is greater than the reference value.

6. The combustion system according to claim 1, wherein the memory has stored therein further program instructions that, when executed by the processor, cause the processor to calculate an injection index based on the fuel pressure and the mixing ratio, and
wherein said estimating the injection amount includes using the injection index to estimate the injection amount.

7. The combustion system according to claim 1, wherein the memory has stored therein further program instructions that, when executed by the processor, cause the processor to estimate an HC ratio, which is a ratio of hydrogen atoms and carbon atoms, based on the mixing ratio, and
wherein said estimating the injection amount includes using the estimated HC ratio to estimate the injection amount.

8. The combustion system according to claim 1, wherein the first sensor includes at least a property sensor.

9. The combustion system according to claim 1, wherein the first sensor includes at least an in-cylinder pressure sensor.

\* \* \* \* \*